(12) United States Patent
Li et al.

(10) Patent No.: US 11,882,602 B2
(45) Date of Patent: Jan. 23, 2024

(54) DATA TRANSMISSION METHOD, BASE STATION, AND USER EQUIPMENT

(71) Applicant: HUAWEI TECHNOLOGIES CO., LTD., Shenzhen (CN)

(72) Inventors: Jun Li, Shanghai (CN); Xiaolei Tie, Shanghai (CN); Odile Rollinger, Cambridge (GB); Baokun Shan, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/752,891

(22) Filed: Jan. 27, 2020

(65) Prior Publication Data
US 2020/0170048 A1 May 28, 2020

Related U.S. Application Data

(63) Continuation of application No. PCT/CN2018/099417, filed on Aug. 8, 2018.

(30) Foreign Application Priority Data

Aug. 11, 2017 (CN) .......................... 201710687841.8

(51) Int. Cl.
H04W 74/08 (2009.01)
H04W 76/10 (2018.01)
(Continued)

(52) U.S. Cl.
CPC ....... *H04W 74/0833* (2013.01); *H04W 72/23* (2023.01); *H04W 74/004* (2013.01); *H04W 74/006* (2013.01); *H04W 76/10* (2018.02)

(58) Field of Classification Search
CPC ............. H04W 74/0833; H04W 76/10; H04W 72/1289
See application file for complete search history.

(56) References Cited

U.S. PATENT DOCUMENTS 10,721,775 B2 * 7/2020 Park .................. H04W 74/0833
2010/0002630 A1 * 1/2010 Park ..................... H04W 74/006
370/328
(Continued)

FOREIGN PATENT DOCUMENTS

CN 106792608 A 5/2017

OTHER PUBLICATIONS

3GPP TSG-RAN WG1 Meeting #89 R1-1708800 Hangzhou, China, May 15-19, 2017 Qualcomm Incorporated "Early Data Transmission" (Year: 2017).*

(Continued)

*Primary Examiner* — Kevin M Cunningham
(74) *Attorney, Agent, or Firm* — Maier & Maier, PLLC

(57) ABSTRACT

A data transmission method, a base station, and user equipment are provided. The method includes: receiving, by a base station, a random access request sent by user equipment, where the random access request carries indication information to request uplink scheduling information; and sending, by the base station, a random access response to the user equipment, where the random access response carries first uplink scheduling information or second uplink scheduling information, the first uplink scheduling information indicates that a message Msg 3 uses a first transport block, the second uplink scheduling information indicates that the Msg 3 uses a second transport block, the first transport block is larger than the second transport block, the first transport block can be used to transmit signaling and user data, and the second transport block can be used to transmit the signaling, but is not used to transmit the user data.

16 Claims, 10 Drawing Sheets

(51) Int. Cl.
*H04W 74/00* (2009.01)
*H04W 72/23* (2023.01)

(56) References Cited

U.S. PATENT DOCUMENTS

| | | | |
|---|---|---|---|
| 2010/0074130 A1* | 3/2010 | Bertrand | H04W 74/0833 370/252 |
| 2014/0376480 A1* | 12/2014 | Bergstrom | H04W 48/20 370/329 |
| 2015/0305065 A1 | 10/2015 | Bai et al. | |
| 2016/0100422 A1 | 4/2016 | Papasakellariou et al. | |
| 2018/0324854 A1* | 11/2018 | Phuyal | H04W 74/085 |
| 2020/0037368 A1* | 1/2020 | Hoglund | H04W 72/14 |

OTHER PUBLICATIONS

Huawei et al., "Early data transmission for the CP solution", 3GPP TSG-RAN WG2 Meeting #99, R2-1708300, Aug. 21-25, 2017, total 9 pages, Berlin, Germany.

3GPP TS 36.212 V14.3.0, "3rd Generation Partnership Project; Technical Specification Group Radio Access Network; Evolved Universal Terrestrial Radio Access (E-UTRA); Multiplexing and channel coding (Release 14)", Jun. 2017, total 198 pages.

Ericsson, "Early Data Transmission for NB-IoT", 3GPP TSG-RAN WG1 #89s, R1-1706895, May 15-19, 2017, total 8 pages, Hangzhou, China.

3GPP TS 36.213 V1.2.0, "3rd Generation Partnership Project; Technical Specification Group Radio Access Network; Physical layer procedures (Release 8)", May 2007, total 10 pages.

Qualcomm Incorporated, "Early data transmission", 3GPP TSG-RAN WG1 Meeting #89, R1-1708800, May 15-19, 2017, total 10 pages, Hangzhou, China.

3GPP TS 36.300 V14.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Jun. 2017, total 331 pages.

LG Electronics, "Data Transmission During random access procedure in NB-IoT", 3GPP TSG RAN WG1 Meeting #89, R1-1707579, May 15-19, 2017, total 6 pages, Hangzhou, P.R. China.

3GPP TS 36.321 V13.6.0, "3rd Generation Partnership Project; Technical Specification Group Radio Access Network; Evolved Universal Terrestrial Radio Access (E-UTRA); Medium Access Control (MAC) protocol specification (Release 13)", Jun. 2017, total 93 pages.

3GPP TS 36.331 V14.3.0, "3rd Generation Partnership Project; Technical Specification Group Radio Access Network; Evolved Universal Terrestrial Radio Access (E-UTRA); Radio Resource Control (RRC); Protocol specification (Release 14)", Jun. 2017, total 745 pages.

Huawei et al., "On early data transmission for Nb-Iot", 3GPP TSG RAN WG1 Meeting #90, R1-1713363, Aug. 21-25, 2017, total 4 pages, Prague, Czech Republic.

Huawei et al., "Enhanced UP solution for early data transmission in MTC", 3GPP TSG RAN WG2 Meeting #99 Meeting, R2-1709335, Aug. 21-25, 2017, total 3 pages, Berlin, Germany.

Ericsson, "Inactive to Connected state transitions", 3GPP TSG-RAN WG2 #98, Tdoc R2-1704116, May 15-19, 2017, total 6 pages, Hangzhou, P.R. of China, XP051274723.

* cited by examiner

DATA TRANSMISSION METHOD, BASE STATION, AND USER EQUIPMENT

CROSS-REFERENCE TO RELATED APPLICATIONS

This application is a continuation of International Patent Application No. PCT/CN2018/099417, filed on Aug. 8, 2018, which claims priority to Chinese Patent Application No. 201710687841.8, filed on Aug. 11, 2017, the disclosures of the aforementioned applications are hereby incorporated by reference in their entireties.

TECHNICAL FIELD

Embodiments relate to the field of communications technologies, and in particular, to a data transmission method, a base station, and user equipment.

BACKGROUND

In a cellular network or a cellular-based communications network, such as a cellular-based narrowband internet of things (NB-IoT), user equipment is usually in an idle mode. In the prior art, when user equipment in an idle mode needs to send user data, the user equipment needs to first set up a radio resource control (RRC) connection, transmit the user data after setting up the RRC connection, and then releases the RRC connection after transmission is completed. In addition, after the RRC connection is successfully set up, the user equipment enters a connected mode from the idle mode; and after the RRC connection is released, the user equipment enters the idle mode from the connected mode. Because user equipment consumes comparatively high power in the foregoing process of first setting up the RRC connection, then transmitting the user data, and then releasing the RRC connection, it is currently considered that the user data is sent before the RRC connection is successfully set up.

However, in the prior art, how to allocate a transport block for transmission of the user data before the RRC connection is successfully set up is a problem that needs to be urgently resolved.

SUMMARY

Embodiments provide a data transmission method, a base station, and user equipment, to resolve a problem that needs to be resolved urgently in the prior art and that relates to how to allocate a transport block for transmission of user data before a radio resource control (RRC) connection is successfully set up.

According to a first aspect, an embodiment provides a data transmission method, including:
  receiving, by a base station, a random access request sent by user equipment, where the random access request carries indication information, and the indication information is used to request uplink scheduling information; and
  sending, by the base station, a random access response to the user equipment in response to the random access request, where the random access response carries first uplink scheduling information or second uplink scheduling information, the first uplink scheduling information indicates that a message Msg 3 uses a first transport block, the second uplink scheduling information indicates that the Msg 3 uses a second transport block, the first transport block is larger than the second transport block, the first transport block can be used to transmit signaling and user data, and the second transport block can be used to transmit the signaling, but cannot be used to transmit the user data.

According to the data transmission method provided in the first aspect, the base station receives the random access request sent by the user equipment. The random access request carries the indication information used to request the uplink scheduling information. The base station sends, to the user equipment in response to the random access request, the random access response that carries the first uplink scheduling information or the second uplink scheduling information. The first uplink scheduling information indicates that the message Msg 3 uses the first transport block. The second uplink scheduling information indicates that the Msg 3 uses the second transport block. The first transport block is larger than the second transport block. The first transport block can be used to transmit the signaling and the user data. The second transport block can be used to transmit the signaling, but cannot be used to transmit the user data, so that when the base station can provide the user equipment with first uplink scheduling information or second uplink scheduling information with different quantities of bits when the user equipment requests the uplink scheduling information. In this case, the user equipment can transmit the user data by using first uplink scheduling information with a larger quantity of bits. This resolves a problem of how to allocate a transport block for transmission of the user data before an RRC connection is successfully set up.

In an implementation, when the random access response carries the second uplink scheduling information, the method further includes:
  receiving, by the base station, the Msg 3 sent by the user equipment, where the Msg 3 carries an identifier of the user equipment;
  sending, by the base station, a message Msg 4 to the user equipment, where the Msg 4 carries the identifier of the user equipment; and
  sending, by the base station, third uplink scheduling information to the user equipment, where the third uplink scheduling information is used by the user equipment to send the user data.

In an implementation, the sending, by the base station, of the third uplink scheduling information to the user equipment when no RRC connection is set up between the user equipment and the base station includes:
  adding, by the base station, the third uplink scheduling information to a physical downlink control channel, scrambling the physical downlink control channel by using a temporary cell radio network temporary identifier (TC-RNTI), and sending the scrambled physical downlink control channel to the user equipment.

In an implementation, the base station sends the physical downlink control channel in common search space.

In an implementation, when the random access response carries the first uplink scheduling information, the method further includes:
  receiving, by the base station, the Msg 3 sent by the user equipment, where the Msg 3 carries an identifier of the user equipment and the user data.

In an implementation, the method further includes:
  determining, by the base station based on a currently idle uplink resource of the base station, whether to send the first uplink scheduling information or the second uplink scheduling information to the user equipment.

According to a second aspect, an embodiment provides a data transmission method, including:

receiving, by a base station, a message Msg 3 sent by user equipment in a random access process, where the Msg 3 carries indication information and an identifier of the user equipment, and the indication information is used to request uplink scheduling information;

sending, by the base station, a message Msg 4 to the user equipment in response to the Msg 3, where the Msg 4 carries the identifier of the user equipment and indicates that no RRC connection is set up between the user equipment and the base station; and sending, by the base station, the uplink scheduling information to the user equipment in response to the Msg 3, where the uplink scheduling information is used by the user equipment to send the user data.

According to the data transmission method provided in the second aspect, the base station receives the message Msg 3 that is sent by the user equipment in the random access process and that carries the indication information used to request the uplink scheduling information. The base station sends, to the user equipment in response to the Msg 3, the Msg 4 that carries the identifier of the user equipment and that indicates that no RRC connection is set up between the user equipment and the base station. The base station sends the uplink scheduling information to the user equipment in response to the Msg 3. The uplink scheduling information is used by the user equipment to send the user data, to allocate a data block for transmission of the user data before an RRC connection is successfully set up.

In an implementation, the sending, by the base station, the uplink scheduling information to the user equipment includes:

adding, by the base station, the uplink scheduling information to a physical downlink control channel, scrambling the physical downlink control channel by using a TC-RNTI, and sending the scrambled uplink scheduling information to the user equipment.

In an implementation, the base station sends the physical downlink control channel in common search space.

According to a third aspect, an embodiment provides a data transmission method, including:

sending, by user equipment, a random access request to a base station, where the random access request carries indication information, and the indication information is used to request uplink scheduling information; and receiving, by the user equipment, a random access response sent by the base station, where the random access response carries first uplink scheduling information or second uplink scheduling information, the first uplink scheduling information indicates that a message Msg 3 uses a first transport block, the second uplink scheduling information indicates that the Msg 3 uses a second transport block, the first transport block is larger than the second transport block, the first transport block can be used to transmit signaling and user data, and the second transport block can be used to transmit the signaling, but cannot be used to transmit the user data.

According to the data transmission method provided in the third aspect, the user equipment sends, to the base station, the random access request that carries the indication information used to request the uplink scheduling information. The user equipment receives the random access response that is sent by the base station and that carries the first uplink scheduling information or the second uplink scheduling information. The first uplink scheduling information indicates that the message Msg 3 uses the first transport block. The second uplink scheduling information indicates that the Msg 3 uses the second transport block. The first transport block is larger than the second transport block. The first transport block can be used to transmit the signaling and the user data. The second transport block can be used to transmit the signaling, but cannot be used to transmit the user data, so that when the base station can provide the user equipment with first uplink scheduling information or second uplink scheduling information with different quantities of bits when the user equipment requests the uplink scheduling information. In this case, the user equipment can transmit the user data by using first uplink scheduling information with a larger quantity of bits. This resolves a problem of how to allocate a transport block for transmission of the user data before an RRC connection is successfully set up.

In an implementation, when the random access response carries the second uplink scheduling information, the method further includes:

sending, by the user equipment, the Msg 3 to the base station, where the Msg 3 carries an identifier of the user equipment;

receiving, by the user equipment, a message Msg 4 sent by the base station, where the Msg 4 carries the identifier of the user equipment; and receiving, by the user equipment, third uplink scheduling information sent by the base station, where the third uplink scheduling information is used by the user equipment to send the user data.

In an implementation, the receiving, by the user equipment when no RRC connection is set up between the user equipment and the base station, third uplink scheduling information sent by the base station includes:

descrambling, by the user equipment, a physical downlink control channel by using a TC-RNTI, and obtaining the third uplink scheduling information from the physical downlink control channel.

In an implementation, the descrambling, by the user equipment, of a physical downlink control channel by using a TC-RNTI, and obtaining the third uplink scheduling information from the physical downlink control channel includes:

descrambling, by the user equipment, the physical downlink control channel in common search space by using the TC-RNTI, and obtaining the third uplink scheduling information from the physical downlink control channel.

In an implementation, when the random access response carries the first uplink scheduling information, the method further includes:

sending, by the user equipment, the Msg 3 to the base station, where the Msg 3 carries the user data and an identifier of the user equipment.

According to a fourth aspect, an embodiment provides a data transmission method, including:

sending, by user equipment, a message Msg 3 to a base station in a random access process, where the Msg 3 carries indication information and an identifier of the user equipment, and the indication information is used to request uplink scheduling information;

receiving, by the user equipment, a message Msg 4 sent by the base station, where the Msg 4 carries the identifier of the user equipment and indicates that no RRC connection is set up between the user equipment and the base station; and receiving, by the user equipment, the uplink scheduling information sent by the base station, where the uplink scheduling information is used by the user equipment to send the user data.

According to the data transmission method provided in the fourth aspect, the user equipment sends, to the base station, the message Msg 3 that carries the indication information used to request the uplink scheduling information. The user equipment receives the message Msg 4 that is sent by the base station and that carries the identifier of the user equipment and indicates that no RRC connection is set up between the user equipment and the base station. The user equipment receives the uplink scheduling information sent by the base station. The uplink scheduling information is used by the user equipment to send the user data, to allocate a data block for transmission of the user data before an RRC connection is successfully set up.

In an implementable embodiment, the receiving, by the user equipment, of the uplink scheduling information sent by the base station includes:
  descrambling, by the user equipment, a physical downlink control channel by using a TC-RNTI, and obtaining the uplink scheduling information from the physical downlink control channel.

In an implementable embodiment, the descrambling, by the user equipment, of a physical downlink control channel by using a TC-RNTI, and obtaining the third uplink scheduling information from the physical downlink control channel, includes:
  descrambling, by the user equipment, the physical downlink control channel in common search space by using the TC-RNTI, and obtaining the third uplink scheduling information from the physical downlink control channel.

According to a fifth aspect, an embodiment provides a base station, including:
  a receiving module, configured to receive a random access request sent by user equipment, where the random access request carries indication information, and the indication information is used to request uplink scheduling information; and
  a sending module, configured to send a random access response to the user equipment, where the random access response carries first uplink scheduling information or second uplink scheduling information, the first uplink scheduling information indicates that an Msg 3 uses a first transport block, the second uplink scheduling information indicates that the message Msg 3 uses a second transport block, the first transport block is larger than the second transport block, the first transport block can be used to transmit signaling and user data, and the second transport block can be used to transmit the signaling, but cannot be used to transmit the user data.

In an implementation, when the random access response carries the second uplink scheduling information,
  the receiving module is further configured to receive the Msg 3 sent by the user equipment, where the Msg 3 carries an identifier of the user equipment; and
  the sending module is further configured to send an Msg 4 to the user equipment, where the message Msg 4 carries the identifier of the user equipment, and
  the sending module is further configured to send third uplink scheduling information to the user equipment, where the third uplink scheduling information is used by the user equipment to send the user data.

In an implementation, that the sending module sends third uplink scheduling information to the user equipment when no RRC connection is set up between the user equipment and the base station, includes:
  adding the third uplink scheduling information to a physical downlink control channel, scrambling the physical downlink control channel by using a TC-RNTI, and sending the scrambled physical downlink control channel to the user equipment.

In an implementation, the sending module is configured to send the physical downlink control channel in common search space.

In an implementation, when the random access response carries the first uplink scheduling information, the receiving module is further configured to receive the Msg 3 sent by the user equipment, where the Msg 3 carries an identifier of the user equipment and the user data.

In an implementation, the base station further includes a processing module, configured to determine, based on a currently idle uplink resource of the base station, whether to send the first uplink scheduling information or the second uplink scheduling information to the user equipment.

According to a sixth aspect, an embodiment provides a base station, including:
  a receiving module, configured to receive a message Msg 3 sent by user equipment in a random access process, where the Msg 3 carries indication information and an identifier of the user equipment, and the indication information is used to request uplink scheduling information; and
  a sending module, configured to send a message Msg 4 to the user equipment in response to the Msg 3, where the Msg 4 carries the identifier of the user equipment and indicates that no RRC connection is set up between the user equipment and the base station, and
  the sending module is further configured to send the uplink scheduling information to the user equipment in response to the Msg 3, where the uplink scheduling information is used by the user equipment to send user data.

In an implementation, that the sending module sends the uplink scheduling information to the user equipment includes:
  the sending module adds the uplink scheduling information to a physical downlink control channel, scrambles the physical downlink control channel by using a TC-RNTI, and sends the scrambled physical downlink control channel to the user equipment.

In an implementation, the sending module is configured to send the physical downlink control channel in common search space.

According to a seventh aspect, an embodiment provides user equipment, including:
  a sending module, configured to send a random access request to a base station, where the random access request carries indication information, and the indication information is used to request uplink scheduling information; and
  a receiving module, configured to receive a random access response sent by the base station, where the random access response carries first uplink scheduling information or second uplink scheduling information, the first uplink scheduling information indicates that a message Msg 3 uses a first transport block, the second uplink scheduling information indicates that the Msg 3 uses a second transport block, the first transport block is larger than the second transport block, the first transport block can be used to transmit signaling and user data, and the second transport block can be used to transmit the signaling, but cannot be used to transmit the user data.

In an implementation, when the random access response carries the second uplink scheduling information,
  the sending module is further configured to send the Msg 3 to the base station, where the Msg 3 carries an identifier of the user equipment;
  the receiving module is further configured to receive a message Msg 4 sent by the base station, where the Msg 4 carries the identifier of the user equipment; and
  the receiving module is further configured to receive third uplink scheduling information sent by the base station, where the third uplink scheduling information is used by the user equipment to send user data.

In an implementation, that the receiving module receives, when no RRC connection is set up between the user equipment and the base station, third uplink scheduling information sent by the base station includes:
  descrambling a physical downlink control channel by using a TC-RNTI, and obtaining the third uplink scheduling information from the physical downlink control channel.

In an implementation, that the receiving module descrambles a physical downlink control channel by using a TC-RNTI and obtains the third uplink scheduling information from the physical downlink control channel includes:
  descrambling the physical downlink control channel in common search space by using the TC-RNTI, and obtaining the third uplink scheduling information from the physical downlink control channel.

In an implementation, when the random access response carries the first uplink scheduling information, the sending module is further configured to send the Msg 3 to the base station, where the Msg 3 carries the user data and an identifier of the user equipment.

According to an eighth aspect, an embodiment provides user equipment, including:
  a sending module, configured to send a message Msg 3 to a base station in a random access process, where the Msg 3 carries indication information and an identifier of the user equipment, and the indication information is used to request uplink scheduling information; and
  a receiving module, configured to receive a message Msg 4 sent by the base station, where the Msg 4 carries the identifier of the user equipment and indicates that no RRC connection is set up between the user equipment and the base station, and
  the receiving module is further configured to receive the uplink scheduling information sent by the base station, where the uplink scheduling information is used by the user equipment to send user data.

In an implementation, that the receiving module receives the uplink scheduling information sent by the base station includes:
  descrambling a physical downlink control channel by using a TC-RNTI, and obtaining the uplink scheduling information from the physical downlink control channel.

In an implementation, that the receiving module descrambles a physical downlink control channel by using a TC-RNTI and obtains the third uplink scheduling information from the physical downlink control channel includes:
  descrambling the physical downlink control channel in common search space by using the TC-RNTI, and obtaining the third uplink scheduling information from the physical downlink control channel.

According to a ninth aspect, an embodiment provides a data transmission apparatus. The apparatus includes a processor and a memory. The memory is configured to store a program, and the processor invokes the program stored in the memory, to perform the method provided in the first aspect. The data transmission apparatus may be a base station chip.

According to a tenth aspect, an embodiment provides a data transmission apparatus. The apparatus includes a processor and a memory. The memory is configured to store a program, and the processor invokes the program stored in the memory, to perform the method provided in the second aspect. The data transmission apparatus may be a base station chip.

According to an eleventh aspect, an embodiment provides a data transmission apparatus. The apparatus includes a processor and a memory. The memory is configured to store a program, and the processor invokes the program stored in the memory, to perform the method provided in the third aspect. The data transmission apparatus may be a user equipment chip.

According to a twelfth aspect, an embodiment provides a data transmission apparatus. The apparatus includes a processor and a memory. The memory is configured to store a program, and the processor invokes the program stored in the memory, to perform the method provided in the fourth aspect. The data transmission apparatus may be a user equipment chip.

According to a thirteenth aspect, an embodiment provides a base station, including at least one processing element (or chip) for performing the method in the first aspect.

According to a fourteenth aspect, an embodiment provides a base station, including at least one processing element (or chip) for performing the method in the second aspect.

According to a fifteenth aspect, an embodiment provides user equipment, including at least one processing element (or chip) for performing the method in the third aspect.

According to a sixteenth aspect, an embodiment provides user equipment, including at least one processing element (or chip) for performing the method in the fourth aspect.

According to a seventeenth aspect, an embodiment provides a data transmission program. When being executed by a processor, the program is used to perform the method in the first aspect.

According to an eighteenth aspect, an embodiment provides a program product, for example, a computer readable storage medium, including the program in the seventeenth aspect.

According to a nineteenth aspect, an embodiment provides a data transmission program. When being executed by a processor, the program is used to perform the method in the second aspect.

According to a twentieth aspect, an embodiment provides a program product, for example, a computer readable storage medium, including the program in the nineteenth aspect.

According to a twenty-first aspect, an embodiment provides a data transmission program. When being executed by a processor, the program is used to perform the method in the third aspect.

According to a twenty-second aspect, an embodiment provides a program product, for example, a computer readable storage medium, including the program in the twenty-first aspect.

According to a twenty-third aspect, an embodiment provides a data transmission program. When being executed by a processor, the program is used to perform the method in the fourth aspect.

According to a twenty-fourth aspect, an embodiment provides a program product, for example, a computer readable storage medium, including the program in the twenty-third aspect.

DESCRIPTION OF EMBODIMENTS

Figure 1:
FIG. 1 is a schematic diagram of an application architecture according to an embodiment of this invention.

Embodiments described herein can be applied to a cellular network and a cellular-based communications network, and further relates to a data transmission method. As shown in FIG. 1, an application architecture according to an embodiment may include user equipment and a base station. When the user equipment in an idle mode needs to send user data, the user equipment needs to interact with the base station to complete setup of an RRC connection, and then transmit the user data. It can be noted that the user data in various embodiments may be data from a higher layer (, such as a layer above an RRC layer), for example, a non-access stratum (NAS stratum)). Signaling in various embodiments may be related control information of the RRC layer transmitted by the user equipment in a process in which the user equipment enters a connected mode from the idle mode. For example, the signaling may include at least one of an RRC connection setup request or an RRC connection setup resume request, an identifier of the user equipment, and the like; or may include at least one of RRC connection setup or RRC connection setup resume, an identifier of the user equipment, and the like.

Figure 2:
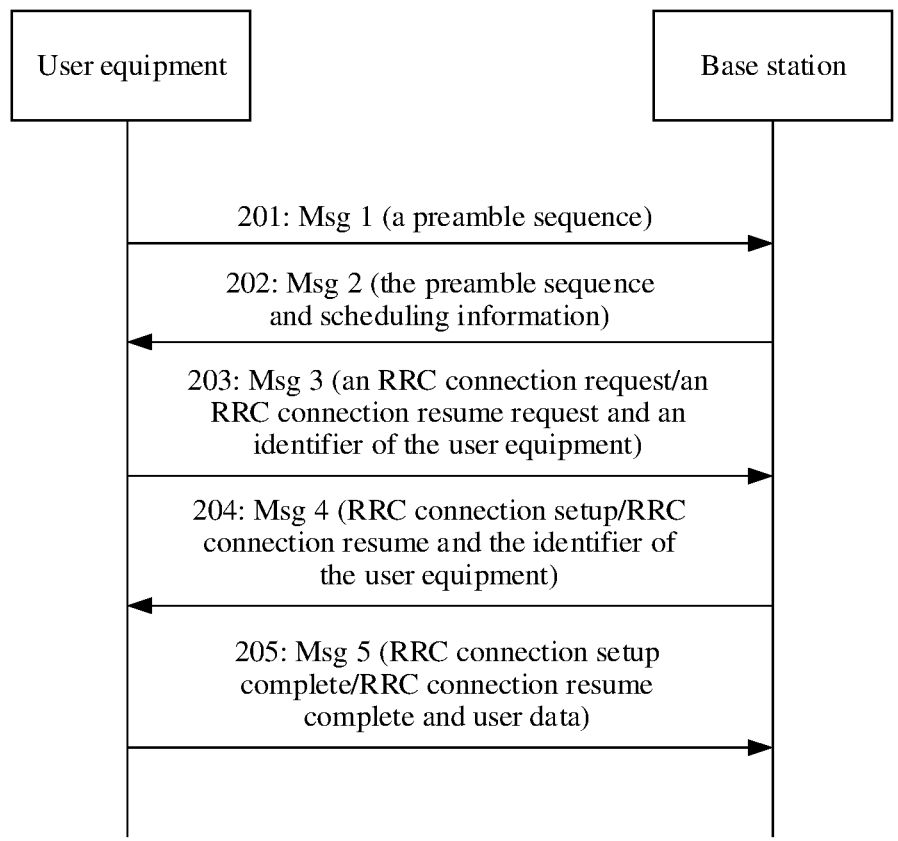
FIG. 2 is a flowchart in which user equipment sends user data in the prior art.

As shown in FIG. 2, in the prior art, a main process of sending user data by user equipment in an idle mode may include the following steps.

Step 201: the user equipment sends a message Msg 1 to a base station, where the Msg 1 includes a preamble sequence.

Here, the user equipment sends the Msg 1 on a physical random access channel (PRACH). The Msg 1 includes the preamble sequence for a purpose of notifying the base station that the user equipment is initiating a random access request currently.

Step 202: after detecting the preamble sequence sent by the user equipment, the base station sends an Msg 2 to the user equipment, where the Msg 2 includes the preamble sequence, and scheduling information that can be used by the user equipment.

In this step, the Msg 2 includes the preamble sequence for a purpose of notifying the user equipment whether the base station has detected the preamble sequence sent by the user equipment. It can be noted that, in the prior art, the scheduling information that can be used by the user equipment and that is included in the Msg 2 is used by the user equipment to transmit an Msg 3 in step 203.

Step 203: the user equipment sends the Msg 3 based on uplink scheduling information specified in the Msg 2, where the Msg 3 includes an identifier of the user equipment and RRC connection request signaling or RRC connection resume request signaling.

Figure 3:
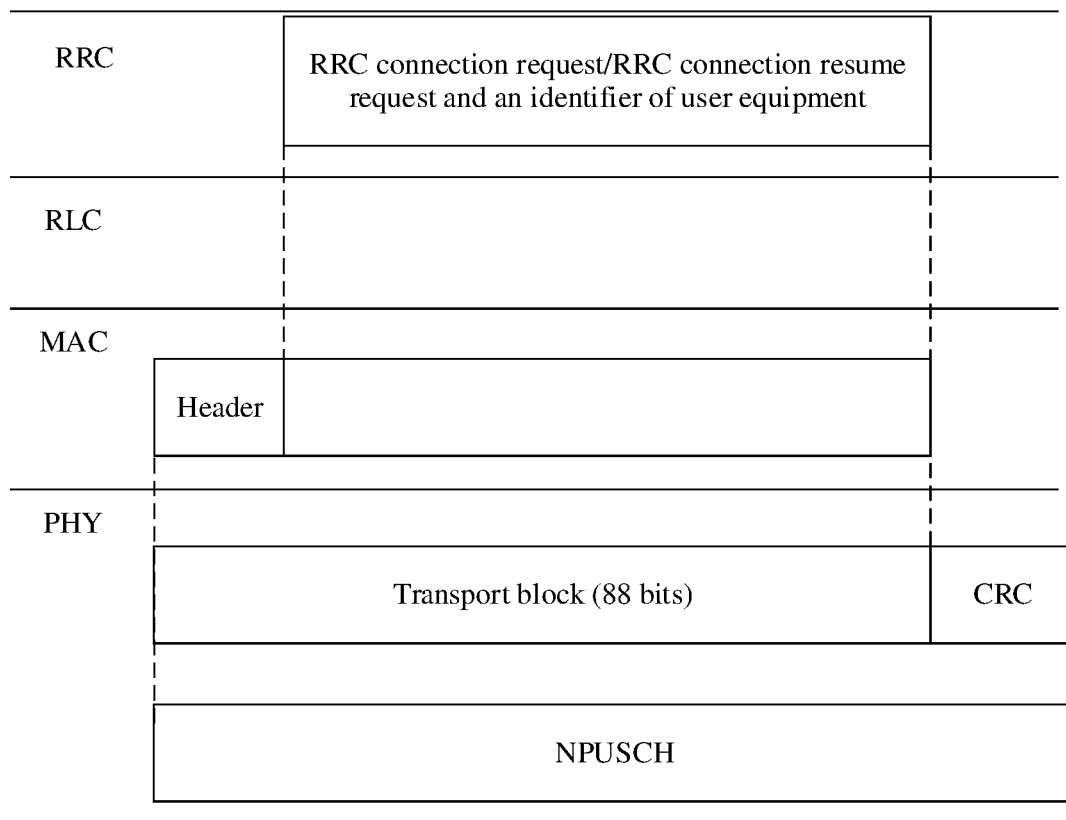
FIG. 3 is a schematic diagram of processing at different layers in the prior art.

In this step, the Msg 3 includes the identifier of the user equipment for a purpose of notifying the base station of specific user equipment that sends the Msg 3. FIG. 3 may show a process of processing the identifier of the user equipment and the RRC connection request signaling or the RRC connection resume request signaling from an RRC layer, to a radio link control (RLC) layer, a medium access control (MAC) layer, a physical (PHY) layer, and finally to a corresponding information bearer channel such as a physical uplink shared channel (PUSCH). In an embodiment, the RRC layer sends the identifier of the user equipment and the RRC connection request signaling or the RRC connection resume request signaling to the MAC layer through transparent transmission at the RLC layer. The MAC layer adds a header to the identifier of the user equipment and the RRC connection request signaling or the RRC connection resume request signaling, and then sends the identifier of the user equipment and the RRC connection request signaling or the RRC connection resume request signaling with the added header to the PHY layer; and the PHY layer adds a cyclic redundancy check (CRC). It can be noted that an example in which a size of a transport block allocated by the base station to the Msg 3 is 88 bits is used in FIG. 3.

Step 204: after receiving the Msg 3, the base station sends an Msg 4 to the user equipment, where the Msg 4 includes the identifier of the user equipment and RRC connection setup signaling or RRC connection resume signaling.

In this step, the Msg 4 includes the identifier of the user equipment for a purpose of resolving a conflict problem in the Msg 3, such as the base station notifies the user equipment that the base station has correctly received the Msg 3 sent by the user equipment.

Step 205: after receiving the Msg 4, the user equipment sends an Msg 5 to the user equipment, where the Msg 5 includes the identifier of the user equipment, RRC connection setup complete signaling or RRC connection resume complete signaling, and user data.

It can be noted that after step 205, the user equipment enters a connected mode from the idle mode, and an RRC connection is successfully set up.

It can be learned from step 201 to step 205 that when sending the user data, the user equipment enters the connected mode from the idle mode. In addition, when entering the idle mode from the connected mode again, the user equipment further needs to release the RRC connection. Consequently, there is a problem that power consumption of the user equipment is comparatively large.

Various embodiments are used below to describe, in detail, technical solutions. The following embodiments may be combined with each other, and a same or similar concept or process may not be described repeatedly in some embodiments.

Figure 4:
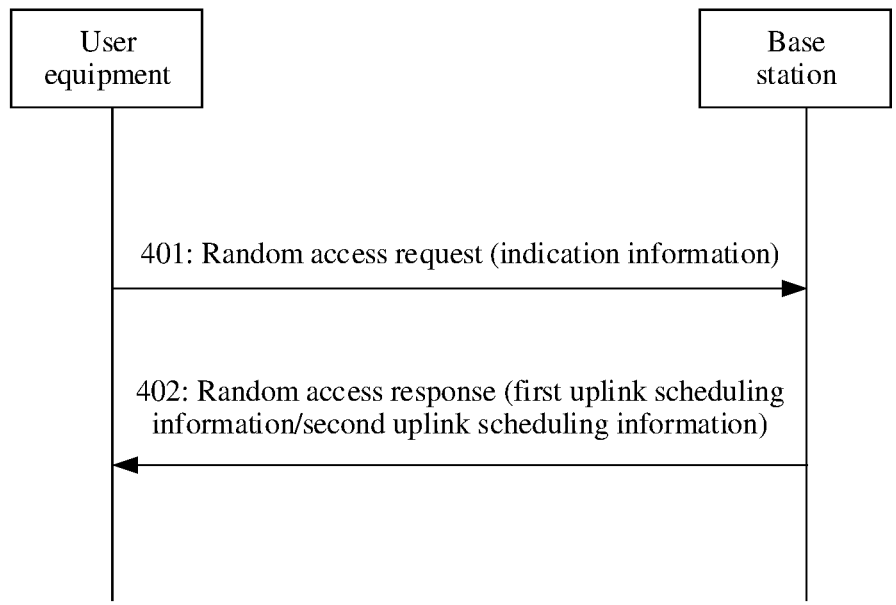
FIG. 4 is a flowchart of a data transmission method according to an embodiment.

FIG. 4 is a flowchart of a data transmission method according to an embodiment. As shown in FIG. 4, the method in this embodiment may include the following steps.

Step 401: user equipment sends a random access request to a base station, where the random access request carries indication information, and the indication information is used to request scheduling information.

In this step the user equipment sends the random access request through a PRACH. Optionally, the indication information may be carried in the Msg 1 shown in FIG. 2. The user equipment requests the uplink scheduling information for a purpose of transmitting user data.

Step 402: the base station sends a random access response to the user equipment in response to the random access request, where the random access response carries first uplink scheduling information or second uplink scheduling information.

In this step, the first uplink scheduling information indicates that a message Msg 3 uses a first transport block, and the second uplink scheduling information indicates that the Msg 3 uses a second transport block. The first transport block is larger than the second transport block. The first transport block can be used to transmit signaling and the user data. The second transport block can be used to transmit the signaling, but cannot be used to transmit the user data. Step 402 may be that the base station determines, based on a currently idle uplink resource of the base station, whether to send the first uplink scheduling information or the second uplink scheduling information to the user equipment. In the embodiment, the base station determines whether a size of the currently idle uplink resource is greater than or equal to a first preset threshold. If the size of the currently idle uplink resource is greater than or equal to the first preset threshold, the base station sends the first uplink scheduling information to the user equipment. If the size of the currently idle uplink resource is less than the first preset threshold, the base station sends the second uplink scheduling information to the user equipment. Alternatively, the base station may determine, based on a quantity of user equipments that currently send indication information to request uplink scheduling information, to send the first uplink scheduling information or the second uplink scheduling information to the user equipment. In the embodiment, the base station determines whether the quantity of user equipments that currently send the indication information to request the uplink scheduling information is less than or equal to a second preset threshold. Further, if the quantity of user equipments that currently send the indication information to request the uplink scheduling information is less than or equal to the second preset threshold, the base station sends the first uplink scheduling information to the user equipment. Alternatively, if the quantity of user equipments that currently send the indication information to request the uplink scheduling information is greater than the second preset threshold, the base station sends the second uplink scheduling information to the user equipment. The currently idle uplink resource may be a currently idle uplink time-frequency resource. It can be noted that, the Msg 3 in this step and the Msg 3 in FIG. 2 are a same message. The second transport block with a smaller size may be used by the user equipment to transmit an identifier of the user equipment. Optionally, the second transport block may further be used to transmit RRC connection request signaling by using the Msg 3. The first transport block with a larger size may be to transmit the identifier of the user equipment and the user data by using the Msg 3. The first transport block and the second transport block may further be used to transmit information such as the RRC connection request signaling by using the Msg 3. The first transport block and the second transport block may be information units that carry data from a higher layer. That the first transport block is larger than the second transport block may be understood as that a transport block size (TBS) of the first transport block is greater than a TBS of the second transport block.

In this embodiment, the user equipment sends the random access request to the base station. The random access request carries the indication information, and the indication information is used to request the scheduling information. The base station sends the random access response to the user equipment in response to the random access request. The random access response carries the first uplink scheduling information or the second uplink scheduling information. The first uplink scheduling information indicates that the message Msg 3 uses the first transport block, and the second uplink scheduling information indicates that the Msg 3 uses the second transport block. A quantity of bits of the first transport block is greater than a quantity of bits of the second transport block. In this way, when the user equipment requests the uplink scheduling information, the base station can provide the user equipment with the first uplink scheduling information or the second uplink scheduling information with different quantities of bits, so that the user equipment can transmit the user data by using first uplink scheduling information with a larger quantity of bits. This resolves a problem of how to allocate a transport block for transmission of the user data before an RRC connection is successfully set up.

Figure 5:
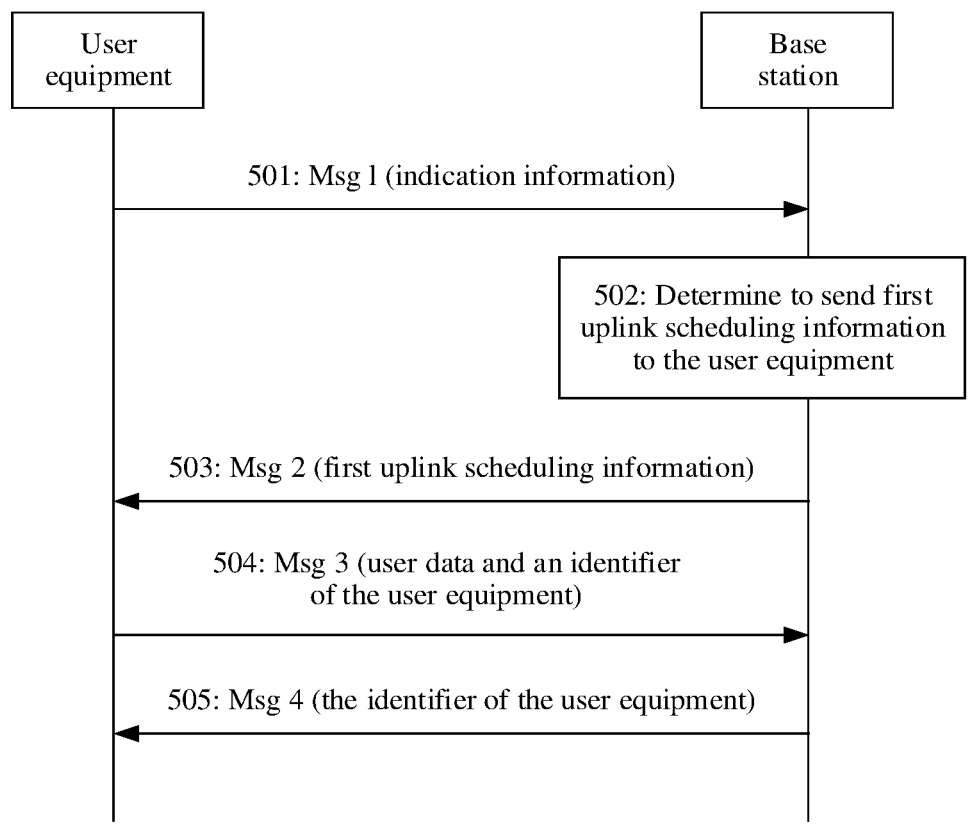
FIG. 5 is a flowchart of a data transmission method according to another embodiment.

FIG. 5 is a flowchart of a data transmission method according to another embodiment. Based on the embodiment shown in FIG. 4, this embodiment describes an implementation in which the base station sends the first uplink scheduling information to the user equipment. As shown in FIG. 5, the method in this embodiment may include the following steps.

Step 501: the user equipment sends an Msg 1 to the base station, where the Msg 1 carries indication information, and the indication information is used to request scheduling information.

In this step, optionally, the indication information may be carried by using a time-frequency resource occupied by a preamble sequence of the Msg 1. For example, if the preamble sequence occupies a time-frequency resource A, it indicates that the indication information is carried. Alternatively, the indication information may be carried by using a preamble sequence used by the Msg 1. For example, if the preamble sequence used by the Msg 1 is a preamble sequence B, it indicates that the indication information is carried. Alternatively, the preamble sequence may be grouped. The indication information is carried by using a group to which the preamble sequence belongs. For example, if the preamble sequence belongs to a group C, it indicates that the indication information is carried.

Step 502: after receiving the Msg 1, the base station determines, based on a currently idle uplink resource of the base station, to send the first uplink scheduling information to the user equipment.

In this step, optionally, when determining that a size of the currently idle uplink resource is greater than or equal to a first preset threshold, the base station sends the first uplink scheduling information to the user equipment. The first uplink scheduling information indicates that a message Msg 3 uses a first transport block, and the first transport block can be used to transmit signaling and user data.

Alternatively, the base station may determine, based on a quantity of user equipments that currently send indication information to request uplink scheduling information, to send the first uplink scheduling information to the user equipment. In an embodiment, when determining that the quantity of user equipments that currently send the indication information to request the uplink scheduling information is less than or equal to the second preset threshold, the base station sends the first uplink scheduling information to the user equipment.

Step 503: the base station sends an Msg 2 to the user equipment, where the Msg 2 carries the first uplink scheduling information.

Step 504: the user equipment sends the Msg 3 to the base station based on the Msg 2, where the Msg 3 carries the user data and the identifier of the user equipment.

Figure 6:
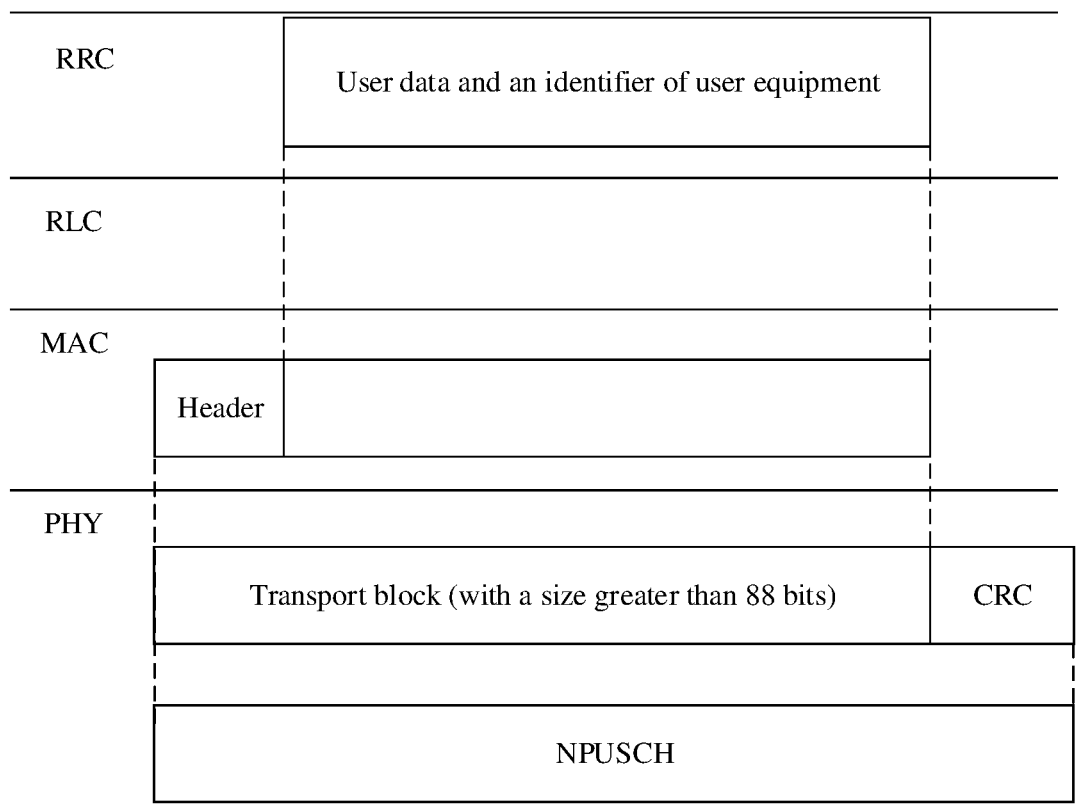
FIG. 6 is a first schematic diagram of processing at different layers according to an embodiment.

In this step, the user equipment sends the Msg 3 to the base station based on the first uplink scheduling information indicated in the Msg 2. The Msg 3 may carry no RRC connection request signaling or the RRC connection resume request signaling, to prevent the user equipment from entering a connected mode from an idle mode. It can be noted that a purpose of carrying the identifier of the user equipment in this step is the same as that in step 203, and details are not described herein again. FIG. 6 may show a process of processing the identifier of the user equipment and the user data from an RRC layer, to an RLC, a MAC, and a PHY, and finally to a corresponding physical bearer channel such as a PUSCH. In the embodiment, the RRC layer sends the identifier of the user equipment and the user data to the MAC layer through transparent transmission at the RLC layer, the MAC layer adds a header to the identifier of the user equipment and the user data, and then sends the identifier of the user equipment and the user data with the added header to the PHY layer; and the PHY layer adds a CRC. It can be noted that an example in which a size of a transport block allocated by the base station to the Msg 3 is greater than 88 bits is used in FIG. 6. It can be noted that the Msg 3 used to transmit the user data may alternatively correspond to a new message name. This is not limited in the embodiments.

Step 505: after receiving the Msg 3, the base station sends an Msg 4 to the user equipment, where the Msg 4 carries the identifier of the user equipment.

In this step, optionally, the Msg 4 may be used to indicate that no RRC connection is set up between the user equipment and the base station. In an embodiment, the Msg 4 may carry no RRC connection setup signaling or RRC connection resume signaling, or carry RRC connection reject signaling, to indicate that no RRC connection is set up between the user equipment and the base station. Thus, when the Msg 3 carries no RRC connection request signaling (or RRC connection resume request signaling), the Msg 4 carries no RRC connection setup signaling (or RRC connection resume request signaling). When the Msg 3 carries RRC connection request signaling (or RRC connection resume request signaling), if the base station requires the user equipment to enter the connected mode, the Msg 4 may further carry the RRC connection setup signaling (or the RRC connection resume signaling); or if the base station does not require the user equipment to enter the connected mode, the Msg 4 may carry no RRC connection setup signaling or RRC connection resume signaling, or the Msg 4 may carry the RRC connection reject signaling.

After receiving the user data, the base station may forward the user data to another network element device, such as a mobility management entity (MME). When receiving information (end indication) that is sent by the another network element device and used to indicate that the user data has been successfully received and that no other data is to be sent to the user equipment, optionally, the base station may add the information to the Msg 4 and send the Msg 4 to the user equipment.

Optionally, when the Msg 4 indicates that no RRC connection is set up between the user equipment and the base station, user data that needs to be sent to the user equipment by another network element device may alternatively be carried in the Msg 4.

In this embodiment, the user equipment sends the Msg 1 to the base station. The Msg 1 carries the indication information, and the indication information is used to request the scheduling information. The base station sends the Msg 2 to the user equipment in response to the Msg 1. The Msg 2 carries the first uplink scheduling information. The user equipment sends the Msg 3 to the base station based on the Msg 2. The Msg 3 carries the user data, so that the user equipment sends the user data to the base station by using the Msg 3. This resolves a problem of how to allocate a transport block for transmission of the user data before an RRC connection is successfully set up. In addition, the base station sends the Msg 4 to the user equipment after receiving the Msg 3. The Msg 4 indicates that no RRC connection is set up between the user equipment and the base station, so that the user equipment does not enter the connected mode. This reduces power consumption of the user equipment.

It can be noted that currently, an NB-IoT mainly supports two user equipment categories (Category): a category NB 1 and a category NB 2. For the category NB 1, a maximum TBS of a PDSCH is 680 bits, and a maximum TBS of a PUSCH is 1000 bits. For the category NB 2, maximum TBSs of a PDSCH and a PUSCH both are 2536 bits. If a size of the first transport block is less than or equal to 1000 bits, both user equipment of the category NB 1 and user equipment of the category NB 2 can support sending of the user data by using the Msg 3. However, if a size of the first transport block is greater than 1000 bits, user equipment of the category NB 1 cannot be used according to an existing protocol. Therefore, when the size of the first transport block is greater than 1000 bits, processing may be performed in the following manners: (A) the protocol directly specifies that only the user equipment of the category NB 2 instead of the user equipment of the category NB 1 supports transmission of the user data by using the Msg 3. In this case, the user equipment of the category NB 2 may complete transmission of the user data according to the embodiment shown in FIG. 5. (B) The protocol directly specifies that the size of the first transport block cannot be greater than 1000 bits without distinguishing between the category NB 1 and the category NB 2. In this case, both user equipments can complete transmission of the user data according to the embodiment shown in FIG. 5. (C) The meanings of TBSs allocated by using the first uplink scheduling information in the Msg 2 of the category NB 1 and the category NB 2 are different for different levels of UEs. For example, for the first uplink scheduling information, the category NB 1 understands that the TBS allocated by using the first uplink scheduling information is X bits, but the category NB 2 understands that the TBS allocated by using the first uplink scheduling information is Y bits, where X is not equal to Y. (D) The base station broadcasts in a system message whether to support the category NB 1. (E) The base station broadcasts a size of the first transport block in a system message. If the broadcast size is less than or equal to 1000 bits, the user equipment of the category NB 1 can transmit the user data by using the Msg 3. Otherwise, the user equipment of the category NB 1 cannot transmit the user data by using the Msg 3.

Figure 7:
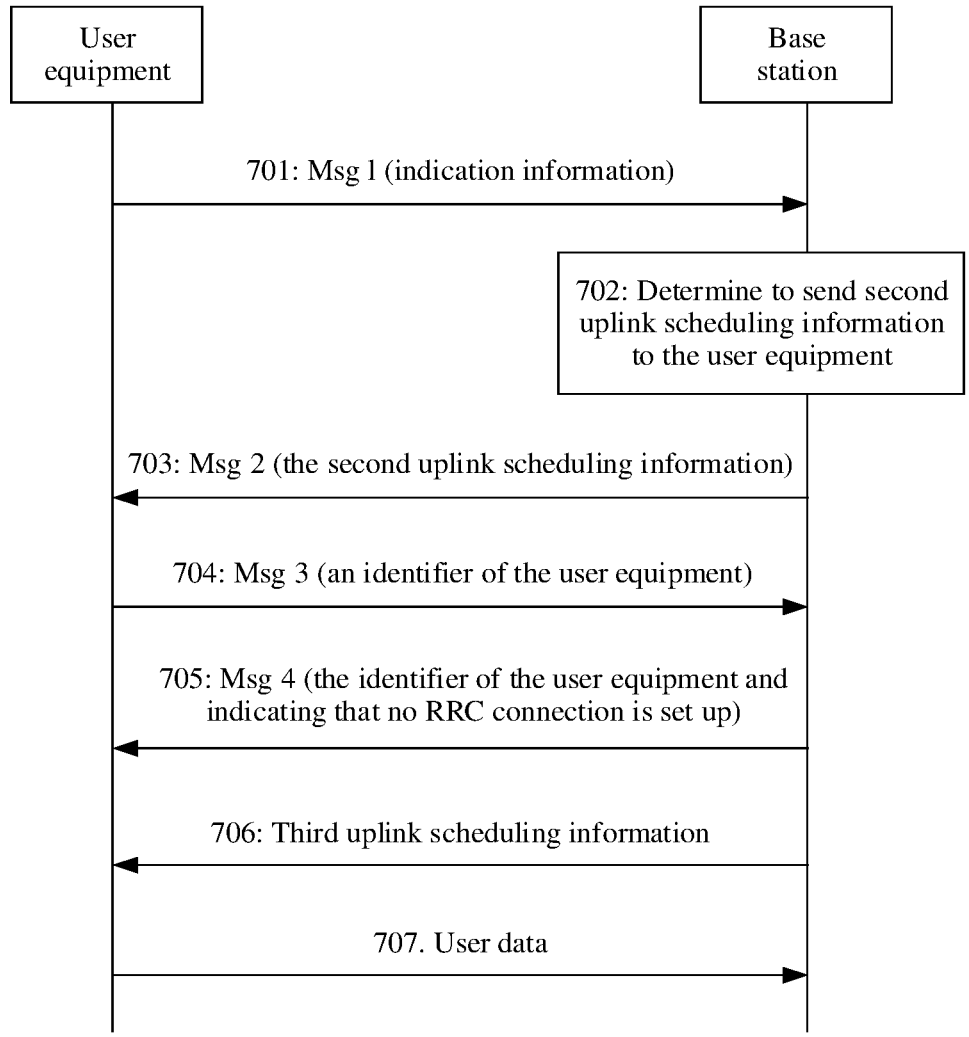
FIG. 7 is a flowchart of a data transmission method according to still another embodiment.

FIG. 7 is a flowchart of a data transmission method according to still another embodiment. Based on the embodiment shown in FIG. 4, this embodiment mainly describes an implementation in which the base station sends the second uplink scheduling information to the user equipment. As shown in FIG. 7, the method in this embodiment may include the following steps.

Step 701: the user equipment sends an Msg 1 to the base station, where the Msg 1 carries indication information, and the indication information is used to request scheduling information.

It can be noted that step 701 is similar to step 501, and details are not described herein again.

Step 702: after receiving the Msg 1, the base station determines, based on a currently idle uplink resource of the base station, to send the second uplink scheduling information to the user equipment.

In this step, optionally, when determining that a size of the currently idle uplink resource is less than a preset threshold, the base station sends first uplink scheduling information to the user equipment. Optionally, the second uplink scheduling information indicates that a size of a second transport block used by an Msg 3 may be, for example, 88 bits. The second uplink scheduling information indicates that the Msg 3 uses the second transport block, and the second transport block can be used to transmit the signaling, but cannot be used to transmit the user data.

Alternatively, when determining that a function of sending the user data before an RRC connection is successfully set up is not enabled, the base station sends the second uplink scheduling information to the user equipment.

Alternatively, the base station may determine, based on a quantity of user equipments that currently send indication information to request uplink scheduling information, to send the second uplink scheduling information to the user equipment. In such an embodiment, when determining that the quantity of user equipments that currently send the indication information to request the uplink scheduling information is greater than the second preset threshold, the base station sends the second uplink scheduling information to the user equipment.

Step 703: the base station sends an Msg 2 to the user equipment, where the Msg 2 carries the second uplink scheduling information.

It can be noted that step 703 is similar to step 503, and details are not described herein again.

Step 704: the user equipment sends the Msg 3 to the base station based on the Msg 2, where the Msg 3 carries the identifier of the user equipment.

In this step, the user equipment sends the Msg 3 to the base station based on the second uplink scheduling information indicated in the Msg 2. The Msg 3 may carry no RRC connection request signaling or RRC connection resume request signaling, to prevent the user equipment from entering a connected mode from an idle mode. It can be noted that a purpose of carrying the identifier of the user equipment in this step is the same as that in step 203, and details are not described herein again.

Step 705: after receiving the Msg 3, the base station sends an Msg 4 to the user equipment, where the Msg 4 carries the identifier of the user equipment and indicates that no RRC connection is set up between the user equipment and the base station.

In this step, the Msg 4 indicates that no RRC connection is set up between the user equipment and the base station, for a purpose of preventing the user equipment from entering the connected mode from the idle mode. The Msg 4 may carry no RRC connection setup signaling or RRC connection resume signaling, or carry RRC connection reject signaling, to indicate that no RRC connection is set up between the user equipment and the base station. Optionally, user data that needs to be sent to the user equipment by another network element device may also be carried in the Msg 4.

Step 706: the base station sends third uplink scheduling information to the user equipment, where the third uplink scheduling information is used by the user equipment to send the user data.

In this step, because the RRC connection of the user equipment is not successfully set up, the user equipment does not have a corresponding cell radio network temporary identifier (C-RNTI). Optionally, step 706 may be that the base station adds the third uplink scheduling information to a physical downlink control channel (PDCCH), scrambles the physical downlink control channel by using a TC-RNTI, and sends the scrambled physical downlink control channel to the user equipment. Optionally, the base station may send the physical downlink control channel in common search space. Optionally, the base station may further perform scrambling by using other information such as the identifier of the user equipment. This is not limited in the embodiments. Optionally, the TC-RNTI is sent to the user equipment by using the Msg 2.

Step 707: the user equipment sends the user data to the user equipment based on the third uplink scheduling information.

In this step, optionally, the user equipment adds the user data to a physical uplink shared channel based on the third uplink scheduling information, scrambles the physical uplink shared channel by using the TC-RNTI, and sends the scrambled physical uplink shared channel to the base station.

Optionally, before step 707, the method may further include: receiving, by the user equipment, the third uplink scheduling information. Optionally, when the base station scrambles the physical downlink control channel that carries the third uplink scheduling information, that the user equipment receives the third uplink scheduling information, may include: descrambling, by the user equipment, the physical downlink control channel by using the TC-RNTI, and obtaining the third uplink scheduling information from the physical downlink control channel. Further, when the base station sends the physical downlink control channel in the common search space, that the user equipment descrambles the physical downlink control channel by using the TC-RNTI and obtains the third uplink scheduling information from the physical downlink control channel may include: descrambling, by the user equipment, the physical downlink control channel in the common search space by using the TC-RNTI, and obtaining the third uplink scheduling information from the physical downlink control channel.

Optionally, after step 707, the method may further include: after receiving the user data, forwarding, by the base station, the user data to another network element device such as an MME; and when receiving an end indication sent by the another network element device, forwarding, by the base station, the end indication to the user equipment.

In this embodiment, the user equipment sends the Msg 1 to the base station. The Msg 1 carries the indication information, and the indication information is used to request the scheduling information. The base station sends the Msg 2 to the user equipment in response to the Msg 1. The Msg 2 carries the second uplink scheduling information. The user equipment sends the Msg 3 to the base station based on the Msg 2. The base station sends the Msg 4 to the user equipment in response to the Msg 3. The Msg 4 indicates that no RRC connection is set up between the user equipment and the base station; and after sending the Msg 4, the base station sends, to the user equipment, the third uplink scheduling information used to send the user data, so that the user equipment sends the user data to the base station before the RRC connection is successfully set up. This resolves a problem of how to allocate a transport block for transmission of the user data before the RRC connection is successfully set up.

Figure 8:
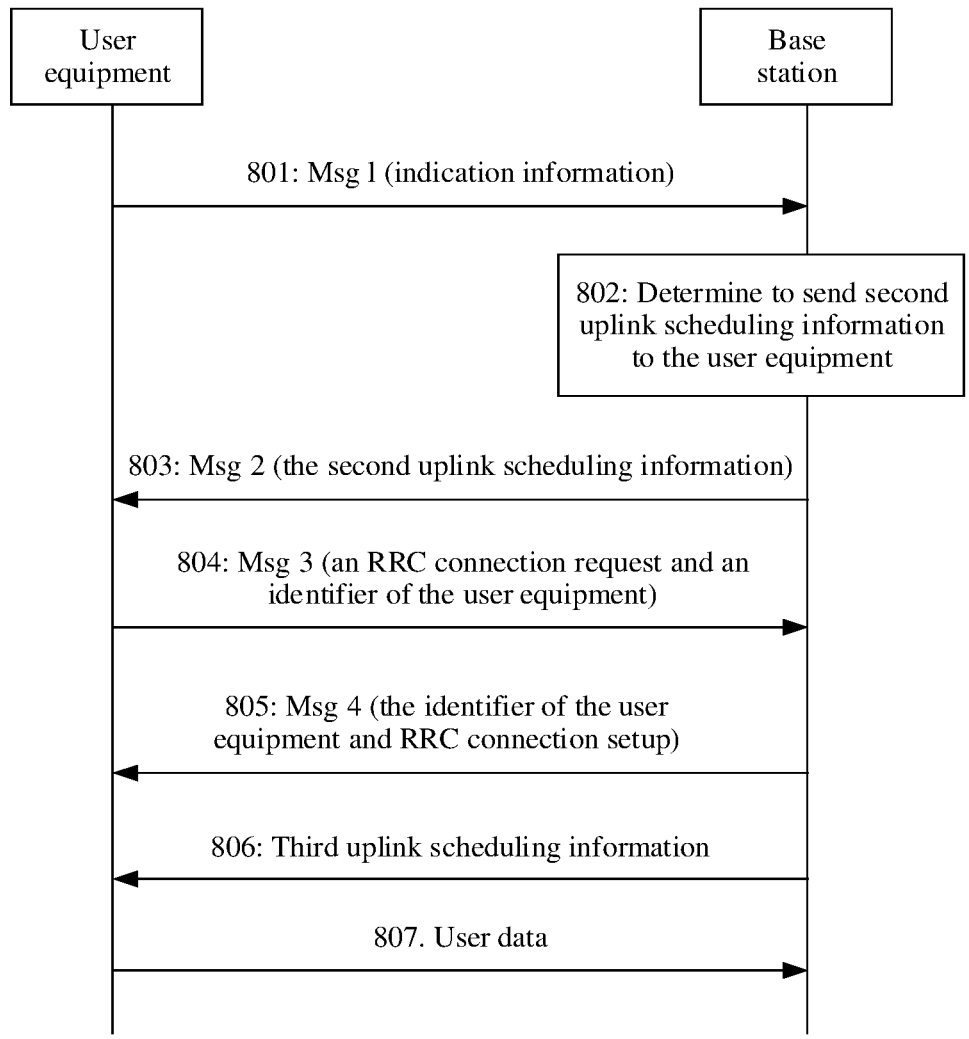
FIG. 8 is a flowchart of a data transmission method according to still another embodiment.

FIG. 8 is a flowchart of a data transmission method according to still another embodiment. Based on the embodiment shown in FIG. 4, this embodiment mainly describes another implementation in which the base station sends the second uplink scheduling information to the user equipment. As shown in FIG. 8, the method in this embodiment may include the following steps.

Step 801: the user equipment sends an Msg 1 to the base station, where the Msg 1 carries indication information, and the indication information is used to request scheduling information.

It can be noted that step 801 is similar to step 501, and details are not described herein again.

Step 802: after receiving the Msg 1, the base station determines, based on a currently idle uplink resource of the base station, to send the second uplink scheduling information to the user equipment.

It can be noted that step 801 is similar to step 701, and details are not described herein again.

Step 803: the base station sends an Msg 2 to the user equipment, where the Msg 2 carries the second uplink scheduling information.

It can be noted that step 803 is similar to step 503, and details are not described herein again.

Step 804: the user equipment sends the Msg 3 to the base station based on the Msg 2, where the Msg 3 carries RRC connection request signaling and the identifier of the user equipment.

In this step, the user equipment sends the Msg 3 to the base station based on the second uplink scheduling information indicated in the Msg 2. Optionally, the RRC connection request signaling carried in the Msg 3 may alternatively be replaced with RRC connection resume request signaling.

Step 805: after receiving the Msg 3, the base station sends an Msg 4 to the user equipment, where the Msg 4 carries the identifier of the user equipment and RRC connection setup signaling.

In this step, optionally, when the Msg 3 carries the RRC connection resume request signaling, the Msg 4 may carry the RRC connection setup signaling or the RRC connection resume signaling. The Msg 4 carries the RRC connection setup signaling or the RRC connection resume signaling for a purpose of successfully setting up an RRC connection between the user equipment and the base station. After the RRC connection is set up, the user equipment enters a connected mode from an idle mode.

Step 806: the base station sends third uplink scheduling information to the user equipment, where the third uplink scheduling information is used by the user equipment to send the user data.

In this step, because the RRC connection of the user equipment has been successfully set up, the user equipment has a corresponding C-RNTI. In this case, optionally, step 806 may be as follows: the base station adds the third uplink scheduling information to a physical downlink control channel PDCCH, scrambles the physical downlink control channel by using the C-RNTI, and sends the scrambled physical downlink control channel to the user equipment.

Step 807: the user equipment sends the user data to the user equipment based on the third uplink scheduling information.

In this step, optionally, the user equipment adds the user data to a physical uplink shared channel based on the third uplink scheduling information, scrambles the physical uplink shared channel by using the C-RNTI, and sends the physical uplink shared channel to the base station.

It can be noted that, after step 807, the method may further include: after receiving the user data, forwarding, by the base station, the user data to another network element device such as an MME; and when receiving an end indication sent by the another network element device, forwarding, by the base station, the end indication to the user equipment.

In this embodiment, the user equipment sends the Msg 1 to the base station. The Msg 1 carries the indication information, and the indication information is used to request the scheduling information. The base station sends the Msg 2 to the user equipment in response to the Msg 1. The Msg 2 carries the second uplink scheduling information. The user equipment sends the Msg 3 to the base station based on the Msg 2. The base station sends the Msg 4 to the user equipment in response to the Msg 3. The Msg 4 carries the RRC connection setup signaling or the RRC connection resume signaling, so that the RRC connection is successfully set up, and after the RRC connection is successfully set up, the base station sends, to the user equipment, the third uplink scheduling information used to send the user data. In this case, although the user equipment requests to send the user data before the RRC connection is successfully set up, the base station may alternatively select, when idle uplink resources are not enough or due to another reason, that the user equipment sends the user data after the RRC connection is successfully set up. This improves system robustness.

Figure 9:
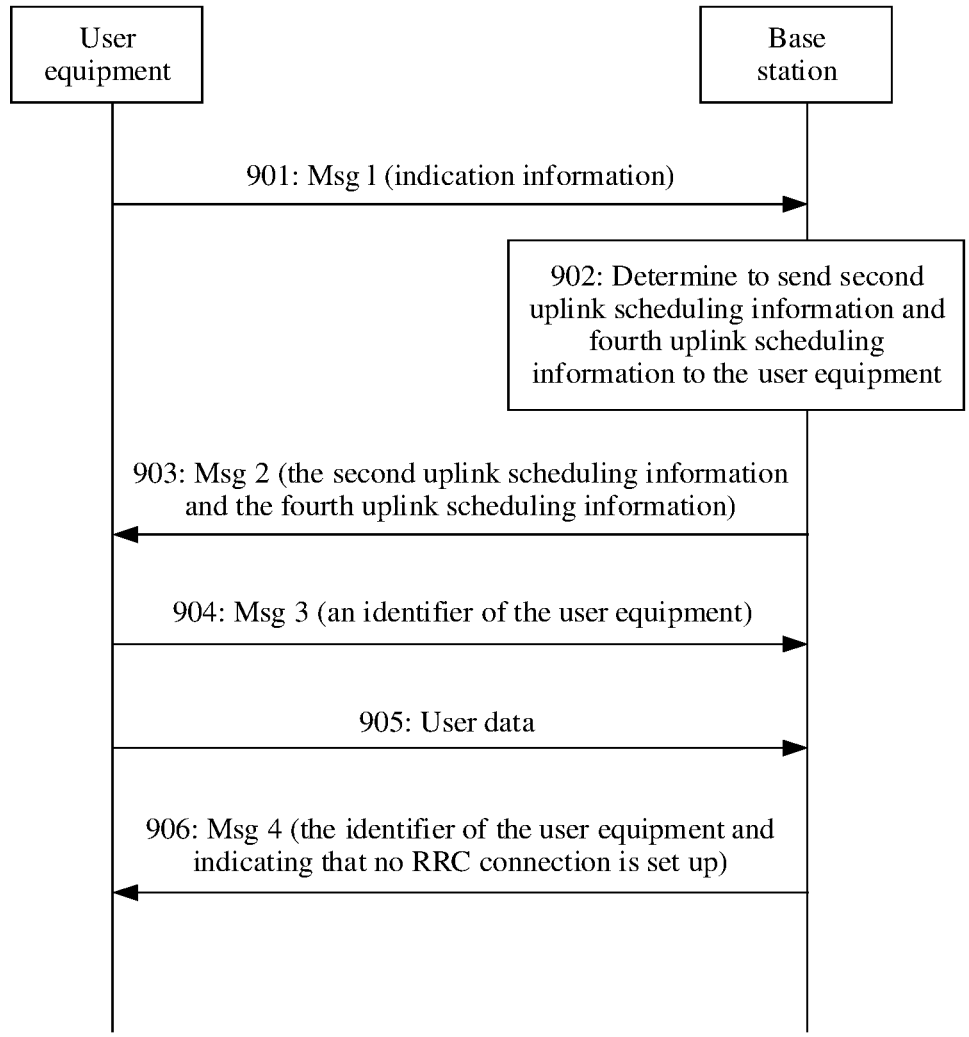
FIG. 9 is a flowchart of a data transmission method according to still another embodiment.

FIG. 9 is a flowchart of a data transmission method according to still another embodiment. Based on the embodiment shown in FIG. 4, this embodiment mainly describes an implementation in which the base station sends the first uplink scheduling information to the user equipment. As shown in FIG. 9, the method in this embodiment may include the following steps.

Step 901: the user equipment sends an Msg 1 to the base station, where the Msg 1 carries indication information, and the indication information is used to request scheduling information.

It can be noted that step 901 is similar to step 501, and details are not described herein again.

Step 902: after receiving the Msg 1, the base station determines, based on a currently idle uplink resource of the base station, to send second uplink scheduling information and fourth uplink scheduling information to the user equipment.

In this step, the second uplink scheduling information indicates that the Msg 3 uses the second transport block, and the second transport block can be used to transmit the signaling, but cannot be used to transmit the user data. The fourth uplink scheduling information is used by the user equipment to transmit user data.

Step 903: the base station sends an Msg 2 to the user equipment, where the Msg 2 carries the second uplink scheduling information and the fourth uplink scheduling information.

In this step, because the Msg 2 needs to include two pieces of uplink scheduling information, a message format of the Msg 2 needs to be modified first. In this embodiment, the following two manners may be used: (1) introducing a new MAC protocol data unit (PDU) random access response and extending an original random access response of the Msg 2, so that the new random access response carries the two pieces of uplink scheduling information. In this embodiment, one piece of uplink scheduling information with 15 bits may be used to schedule the comparatively small second transport block, and the other piece of uplink scheduling information may be used to schedule a comparatively large fourth transport block. Further, whether the original random access response or the new random access response is used needs to be indicated in a subheader of a MAC control element. (2) The Msg 2 is divided into two parts and sent. A first part carries the second uplink scheduling information, and is sent to the user equipment through a PDSCH at a physical layer. A PDCCH corresponding to the PDSCH is scrambled by using an original random access radio network temporary identifier (RA-RNTI). A second part carries the fourth uplink scheduling information, and is sent to the user equipment through a PDSCH at the physical layer. A PDCCH corresponding to the PDSCH is scrambled by using a new RA-RNTI.

Step 904: the user equipment sends the Msg 3 to the base station based on the Msg 2, where the Msg 3 carries the identifier of the user equipment.

In this step, the user equipment sends the Msg 3 to the base station based on the first uplink scheduling information indicated in the Msg 2. The Msg 3 may carry no RRC connection request signaling or RRC connection resume request signaling, to prevent the user equipment from entering a connected mode from an idle mode. It can be noted that a purpose of carrying the identifier of the user equipment in this step is the same as that in step 504, and details are not described herein again. FIG. 3 may show a process of processing data such as the identifier of the user equipment from an RRC layer, to an RLC, a MAC, and a PHY, and finally to a corresponding information bearer channel such as a PUSCH, and details are not described herein again.

Step 905: the user equipment sends the user data to the base station based on the Msg 2.

Figure 10:
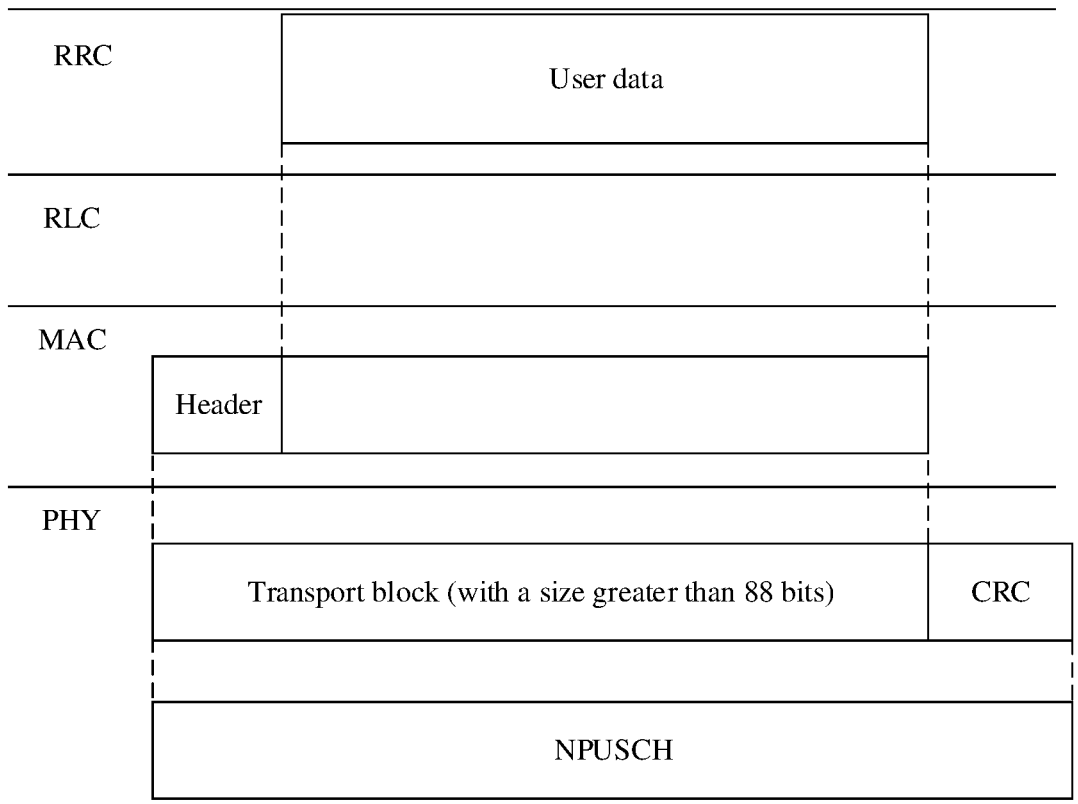
FIG. 10 is a second schematic diagram of processing at different layers according to an embodiment.

In this step, optionally, the base station may add the user data to a physical uplink shared channel, scramble the physical uplink shared channel by using the identifier of the user equipment, and send the physical uplink shared channel to the base station. Scrambling is performed by using the identifier of the user equipment, so that specific user equipment that sends the user data may be indicated to the base station. FIG. 10 may show a process of processing the user data from an RRC layer, to an RLC, a MAC, and a PHY, and finally to a corresponding information bearer channel such as a PUSCH. In this embodiment, the RRC layer sends the user data to the MAC layer through transparent transmission at the RLC layer, the MAC layer sends the user data to the PHY layer after adding a header to the user data, and the PHY layer adds a CRC. It can be noted that an example in which a size of a transport block allocated by the base station to the user data is greater than 88 bits is used in FIG. 10.

It can be noted that a sequence between step 905 and step 904 is not limited.

Step 906: after receiving the Msg 3, the base station sends an Msg 4 to the user equipment, where the Msg 4 carries the identifier of the user equipment and indicates that no RRC connection is successfully set up between the user equipment and the base station.

In this step, it can be noted that for a manner in which the Msg 4 indicates that no RRC connection is successfully set up between the user equipment and the base station, reference may be made to step 505. Details are not described herein again.

After step 905, the method may further include: after receiving the user data, forwarding, by the base station, the user data to another network element device, such as a MME. When receiving information that is sent by the another network element device and used to indicate that the user data has been successfully received and that no other data is to be sent to the user equipment, optionally, the base station may add the information to the Msg 4 and send the Msg 4 to the user equipment.

Optionally, user data that needs to be sent to the user equipment by another network element device may also be carried in the Msg 4.

It can be noted that if descrambling for the physical uplink shared channel is not correctly performed by the base station, the base station may schedule retransmission of the user data after sending the Msg 4; and when retransmitting the user data, may perform scrambling by using a TC-RNTI.

In this embodiment, the user equipment sends the Msg 1 to the base station. The Msg 1 carries the indication information, and the indication information is used to request the scheduling information. The base station sends the Msg 2 to the user equipment in response to the Msg 1. The Msg 2 carries the second uplink scheduling information and the fourth uplink scheduling information. The user equipment sends the Msg 3 to the base station based on the second uplink scheduling information and sends the user data to the base station based on the fourth uplink scheduling information, to resolve a problem of how to allocate a transport block for transmission of the user data before the RRC connection is successfully set up. In addition, the base station sends the Msg 4 to the user equipment after receiving the Msg 3. The carried Msg 4 indicates that no RRC connection is successfully set up between the user equipment and the base station, so that the user equipment does not enter the connected mode. This reduces power consumption of the user equipment.

Figure 11:
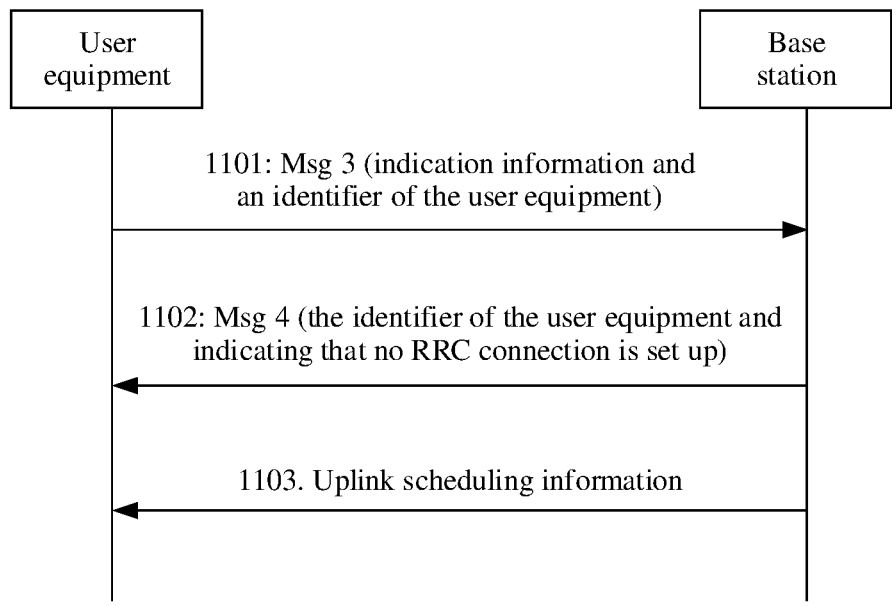
FIG. 11 is a flowchart of a data transmission method according to still another embodiment.

FIG. 11 is a flowchart of a data transmission method according to still another embodiment. As shown in FIG. 11, the method in this embodiment may include the following steps.

Step 1101: user equipment sends an Msg 3 to a base station in a random access process, where the Msg 3 carries indication information and an identifier of the user equipment, and the indication information is used to request uplink scheduling information.

In this step, the user equipment requests the uplink scheduling information for a purpose of transmitting user data. Optionally, the Msg 3 may further carry an RRC connection request or an RRC connection resume request.

Step 1102: the base station sends a message Msg 4 to the user equipment in response to the Msg 3, where the Msg 4 carries the identifier of the user equipment and indicates that no RRC connection is set up between the user equipment and the base station.

In this step, for a purpose and a manner in which the Msg 4 indicates that no RRC connection is set up between the user equipment and the base station, refer to the foregoing embodiment. Details are not described herein again. Optionally, user data that needs to be sent to the user equipment by another network element device may also be carried in the Msg 4.

Step 1103: the base station sends the uplink scheduling information to the user equipment in response to the Msg 3, where the uplink scheduling information is used by the user equipment to send the user data.

In this step, optionally, the base station adds the uplink scheduling information to a physical downlink control channel, scrambles the physical downlink control channel by using the TC-RNTI, and sends the scrambled physical downlink control channel to the user equipment. Optionally, the base station sends the physical downlink control channel in common search space. Optionally, the base station may further perform scrambling by using other information such as the identifier of the user equipment. This is not limited in the embodiments.

It can be noted that when the base station scrambles, by using the TC-RNTI, the physical downlink control channel that carries the uplink scheduling information, the user equipment may receive the uplink scheduling information in the following manner: The user equipment descrambles the physical downlink control channel by using the TC-RNTI and obtains the uplink scheduling information from the physical downlink control channel. Further, when the base station sends the physical downlink control channel in the common search space, that the user equipment descrambles the physical downlink control channel by using the TC-RNTI and obtains the uplink scheduling information from the physical downlink control channel may include: descrambling, by the user equipment, the physical downlink control channel in the common search space by using the TC-RNTI, and obtaining the uplink scheduling information from the physical downlink control channel.

It can be noted that before step 1101, the method may further include step 201 and step 202.

In this embodiment, the user equipment sends the Msg 3 to the base station in the random access process. The Msg 3 carries the indication information and the identifier of the user equipment, and the indication information is used to request the uplink scheduling information. The base station sends the message Msg 4 to the user equipment in response to the Msg 3. The Msg 4 carries the identifier of the user equipment and indicates that no RRC connection is set up between the user equipment and the base station. The base station sends the uplink scheduling information to the user equipment. The uplink scheduling information is used by the user equipment to send the user data, to allocate a data block for transmission of the user data before an RRC connection is successfully set up.

Base Station Embodiment 1

Figure 12:
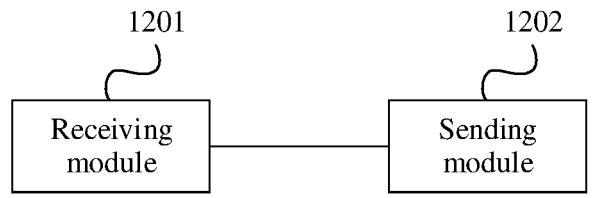
FIG. 12 is a schematic structural diagram of a base station according to an embodiment.

FIG. 12 is a schematic structural diagram of a base station according to an embodiment. As shown in FIG. 12, the base station may include a receiving module 1201 and a sending module 1202. The receiving module 1201 is configured to receive a random access request sent by user equipment. The random access request carries indication information, and the indication information is used to request uplink scheduling information. The sending module 1202 is configured to send a random access response to the user equipment in response to the random access request. The random access response carries first uplink scheduling information or second uplink scheduling information. The first uplink scheduling information indicates that a message Msg 3 uses a first transport block. The second uplink scheduling information indicates that the Msg 3 uses a second transport block. The first transport block is larger than the second transport block. The first transport block can be used to transmit signaling and user data. The second transport block can be used to transmit the signaling, but cannot be used to transmit the user data.

Optionally, when the random access response carries the second uplink scheduling information,
the receiving module 1201 is further configured to receive the Msg 3 sent by the user equipment, where the Msg 3 carries an identifier of the user equipment;
the sending module 1202 is further configured to send a message Msg 4 to the user equipment, where the Msg 4 carries the identifier of the user equipment; and
the sending module 1202 is further configured to send third uplink scheduling information to the user equipment, where the third uplink scheduling information is used by the user equipment to send the user data.

Optionally, when no RRC connection is set up between the user equipment and the base station, that the sending module 1202 sends the third uplink scheduling information to the user equipment includes:
adding the third uplink scheduling information to a physical downlink control channel, scrambling the physical downlink control channel by using a TC-RNTI, and sending the scrambled physical downlink control channel to the user equipment.

Optionally, the sending module 1202 is configured to send the physical downlink control channel in common search space.

Optionally, when the random access response carries the first uplink scheduling information, the receiving module 1201 is further configured to receive the Msg 3 sent by the user equipment. The Msg 3 carries an identifier of the user equipment and the user data.

Optionally, the base station further includes a processing module, configured to determine, based on a currently idle uplink resource of the base station, whether to send the first uplink scheduling information or the second uplink scheduling information to the user equipment.

The base station provided in this embodiment may be configured to perform the technical solution on a base station side in the foregoing method embodiments shown in FIG. 4 to FIG. 10. Implementation principles and technical effects of the base station are similar to those in the technical solution, and details are not described herein again.

Base Station Embodiment 2

This embodiment further provides a base station. A structure of the base station provided in this embodiment is similar to that in the embodiment shown in FIG. 12, and may also include a sending module and a receiving module. The receiving module is configured to receive a message Msg 3 sent by user equipment in a random access process. The Msg 3 carries indication information and an identifier of the user equipment, and the indication information is used to request uplink scheduling information.

The sending module is configured to send a message Msg 4 to the user equipment in response to the Msg 3. The Msg 4 carries the identifier of the user equipment and indicates that no RRC connection is set up between the user equipment and the base station.

The sending module is further configured to send the uplink scheduling information to the user equipment in response to the Msg 3. The uplink scheduling information is used by the user equipment to send user data.

Optionally, that the sending module sends the uplink scheduling information to the user equipment includes:

the sending module adds the uplink scheduling information to a physical downlink control channel, scrambles the physical downlink control channel by using a TC-RNTI, and sends the scrambled physical downlink control channel to the user equipment.

Optionally, the sending module is configured to send the physical downlink control channel in common search space.

The base station provided in this embodiment may be configured to perform the technical solution on a base station side in the foregoing method embodiments shown in FIG. 11. Implementation principles and technical effects of the base station are similar to those in the technical solution, and details are not described herein again.

It can be understood that division of the modules in the base station is merely logical function division, and during actual implementation, all or some of the modules may be integrated into one physical entity, or may be physically separated. All of the modules may be implemented in a form of software invoked by a processing element, or may be implemented in a form of hardware; or some of the modules may be implemented in a form of software invoked by a processing element, and some of the modules are implemented in a form of hardware. For example, the sending module may be an independently disposed processing element, or may be integrated into a chip of the base station for implementation. In addition, the sending module may be stored in a memory of the base station as a program, and a processing element of the base station invokes and executes a function of the sending unit. Implementations of the other modules are similar thereto. In addition, all or some of the modules may be integrated together, or may be implemented independently. The processing element herein may be an integrated circuit and has a signal processing capability. In an implementation process, the steps in the foregoing method or the foregoing modules can be implemented by using a hardware integrated logic circuit in a processor element, or by using instructions in a form of software. In addition, the sending module is a sending control module and may receive, by using a sending apparatus of the base station such as an antenna or a radio frequency apparatus, information sent by the terminal.

The foregoing modules may be configured as one or more integrated circuits for implementing the foregoing methods, for example, one or more application-specific integrated circuits (ASIC), one or more microprocessors or digital signal processors (DSP), or one or more field programmable gate arrays (FPGA). For another example, when a module is implemented by invoking a program by a processing element, the processing element may be a general-purpose processor, such as a central processing unit (CPU) or another processor that can invoke the program. For another example, the modules may be integrated together, and implemented in a form of a system-on-a-chip (SOC).

User Equipment Embodimenm 1

This embodiment further provides user equipment. A structure of the user equipment provided in this embodiment is similar to that in the embodiment shown in FIG. 12, and may also include a sending module and a receiving module. The sending module is configured to send a random access request to a base station. The random access request carries indication information, and the indication information is used to request uplink scheduling information. The receiving module is configured to receive a random access response sent by the base station. The random access response carries first uplink scheduling information or second uplink scheduling information. The first uplink scheduling information indicates that a message Msg 3 uses a first transport block. The second uplink scheduling information indicates that the Msg 3 uses a second transport block. The first transport block is larger than the second transport block. The first transport block can be used to transmit signaling and user data. The second transport block can be used to transmit the signaling, but cannot be used to transmit the user data.

Optionally, when the random access response carries the second uplink scheduling information, the sending module is further configured to send the Msg 3 to the base station, where the Msg 3 carries an identifier of the user equipment;

the receiving module is further configured to receive a message Msg 4 sent by the base station, where the Msg 4 carries the identifier of the user equipment; and the receiving module is further configured to receive third uplink scheduling information sent by the base station, where the third uplink scheduling information is used by the user equipment to send user data.

Optionally, when no RRC connection is set up between the user equipment and the base station, that the receiving module receives the third uplink scheduling information sent by the base station includes:

descrambling a physical downlink control channel by using a TC-RNTI, and obtaining the third uplink scheduling information from the physical downlink control channel.

Optionally, that the receiving module descrambles the physical downlink control channel by using the TC-RNTI and obtains the third uplink scheduling information from the physical downlink control channel includes:

descrambling the physical downlink control channel in common search space by using the TC-RNTI, and obtaining the third uplink scheduling information from the physical downlink control channel.

Optionally, when the random access response carries the first uplink scheduling information, the sending module is further configured to send the Msg 3 to the base station. The Msg 3 carries the user data and an identifier of the user equipment.

The user equipment provided in this embodiment may be configured to perform the technical solution on a user equipment side in the foregoing method embodiments shown in FIG. 4 to FIG. 10. Implementation principles and technical effects of the user equipment are similar to those in the technical solution, and details are not described herein again.

User Equipment Embodiment 2

This embodiment further provides user equipment. A structure of the user equipment provided in this embodiment is similar to that in the embodiment shown in FIG. 12, and may also include a sending module and a receiving module. The sending module is configured to send a message Msg 3 to a base station in a random access process. The Msg 3 carries indication information and an identifier of the user equipment, and the indication information is used to request uplink scheduling information. The receiving module is configured to receive a message Msg 4 sent by the base station. The Msg 4 carries the identifier of the user equipment and indicates that no RRC connection is set up between the user equipment and the base station. The receiving module is further configured to receive the uplink scheduling information sent by the base station. The uplink scheduling information is used by the user equipment to send user data.

Optionally, that the receiving module receives the uplink scheduling information sent by the base station includes:

descrambling a physical downlink control channel by using a -RNTI, and obtaining the uplink scheduling information from the physical downlink control channel.

Optionally, that the receiving module descrambles the physical downlink control channel by using the TC-RNTI and obtains the third uplink scheduling information from the physical downlink control channel includes:

descrambling the physical downlink control channel in common search space by using the TC-RNTI, and obtaining the third uplink scheduling information from the physical downlink control channel.

The user equipment provided in this embodiment may be configured to perform the technical solution on a user equipment side in the foregoing method embodiments shown in FIG. 11. Implementation principles and technical effects of the user equipment are similar to those in the technical solution, and details are not described herein again.

It can be noted that division of the foregoing units of the module is merely division of logical functions. During actual implementation, all or some of the units may be integrated into one physical entity, or may be physically separated. In addition, all of the units may be implemented in a form of software invoked by a processing element, or may be implemented in a form of hardware; or some of the units may be implemented in a form of software invoked by using a processing element, and some of the units are implemented in a form of hardware. For example, the sending unit may be an independently disposed processing element, or may be integrated into a chip of the module for implementation. In addition, the sending unit may be stored in a memory of the module as a program, and a processing element of the module invokes and executes a function of the sending unit. Implementations of the other units are similar thereto. In addition, all or some of the units may be integrated together, or may be implemented independently. The processing element herein may be an integrated circuit and has a signal processing capability. In an implementation process, steps in the foregoing methods or the foregoing units can be implemented by using a hardware integrated logic circuit in a processor element, or by using instructions in a form of software. In addition, the sending unit is a sending control unit, and may receive, by using a sending apparatus of the module such as an antenna or a radio frequency apparatus, information sent by a base station.

The foregoing units may be configured as one or more integrated circuits for implementing the foregoing methods, for example, one or more ASICs, one or more microprocessors or DSPs, or one or more FPGAs. For another example, when one of the foregoing units is implemented by invoking a program by a processing element, the processing element may be a general-purpose processor, such as a CPU or another processor that can invoke the program. For another example, the units may be integrated together, and implemented in a form of a SOC.

An embodiment may further provide a communications system, including the base station in Base Station Embodiment 1 and the user equipment in user equipment Embodiment 1.

An embodiment may further provide a communications system, including the base station in Base Station Embodiment 2 and the user equipment in User Equipment Embodiment 2.

Figure 13:
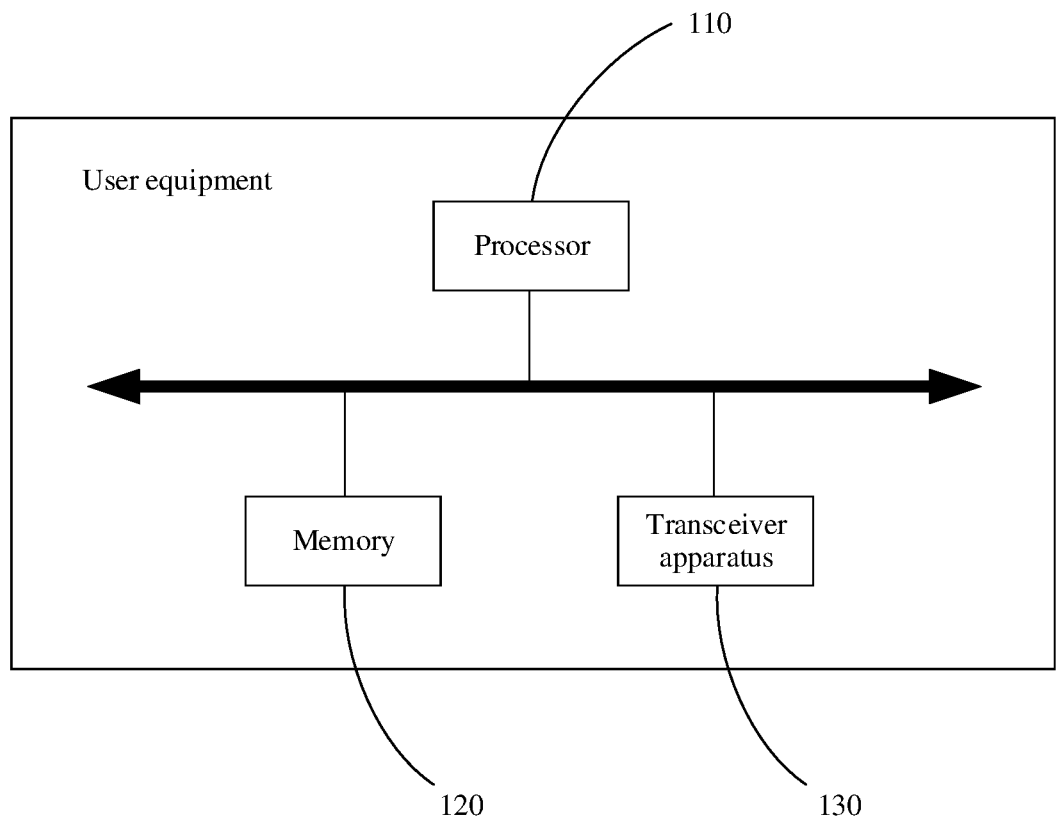
FIG. 13 is a schematic structural diagram of user equipment according to another embodiment.

FIG. 13 is a schematic structural diagram of user equipment according to another embodiment. As shown in FIG. 13, the module includes a processor 110, a memory 120, and a transceiver apparatus 130. The transceiver apparatus 130 may be connected to an antenna. In a downlink direction, the transceiver apparatus 130 receives, by using the antenna, information sent by a base station, and sends the information to the processor 110 for processing. In an uplink direction, the processor 110 processes data of the module, and sends processed data to the base station by using the transceiver apparatus 130.

The memory 120 is configured to store a program for implementing the foregoing method embodiment or the units in the embodiments shown in FIG. 9 and FIG. 10. The processor 110 invokes the program to perform operations in the foregoing method embodiment, to implement the units shown in FIG. 9 and FIG. 10.

Alternatively, some or all of the foregoing units may also be implemented in a form of an integrated circuit that is embedded into a chip of the module. In addition, the units may be implemented separately, or may be integrated. Thus, the foregoing units may be configured as one or more integrated circuits for implementing the foregoing methods, for example, one or more ASICs, one or more microprocessors or DSPs, or one or more FPGAs.

Figure 14:
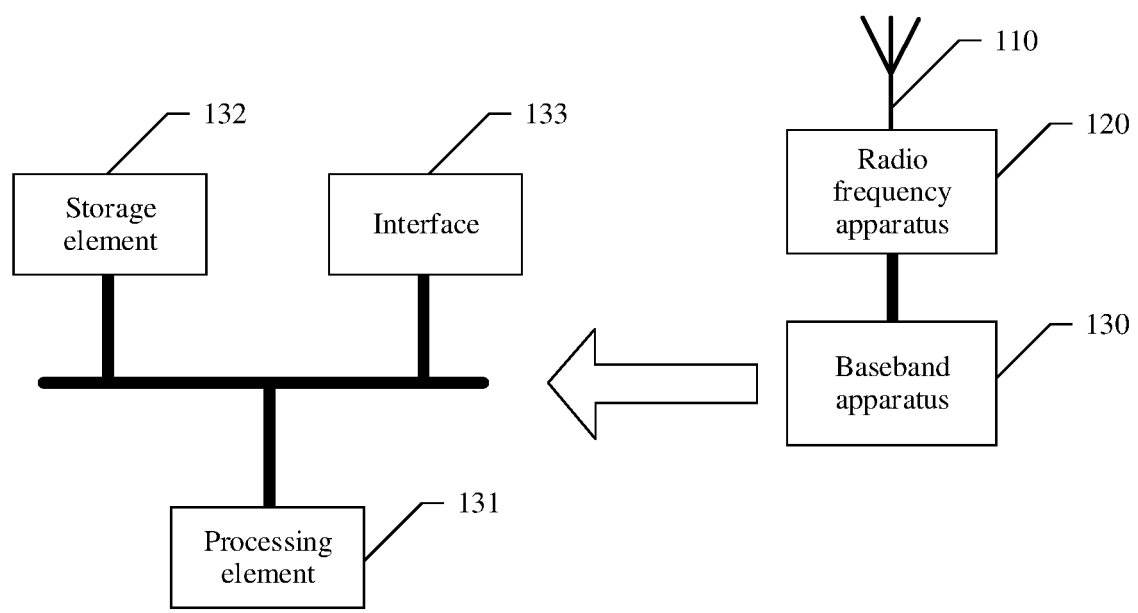
FIG. 14 is a schematic structural diagram of a base station according to another embodiment.

FIG. 14 is a schematic structural diagram of a base station according to another embodiment. As shown in FIG. 14, the base station includes an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by a terminal, and sends, to the baseband apparatus 130 for processing, the information sent by the terminal. In a downlink direction, the baseband apparatus 130 processes information of a terminal, and sends the information to the radio frequency apparatus 120. The radio frequency apparatus 120 processes the information of the terminal and then sends processed information to the terminal by using the antenna 110.

In an implementation, the foregoing units are implemented in a form of a processing element scheduling a program. For example, the baseband apparatus 130 includes a processing element 131 and a storage element 132, and the processing element 131 invokes a program stored in the storage element 132, to perform the methods in the foregoing method embodiments. In addition, the baseband apparatus 130 may further include an interface 133, configured to exchange information with the radio frequency apparatus 120. The interface is, for example, a common public radio interface (CPRI).

In another implementation, the foregoing units may be one or more processing elements configured to implement the foregoing methods. The processing elements are disposed on the baseband apparatus 130. The processing element herein may be an integrated circuit, for example, one or more ASICs, one or more microprocessors or DSPs, or one or more FPGAs. The integrated circuits may be integrated together to form a chip.

For example, the foregoing units may be integrated together in a form of a SOC. For example, the baseband apparatus 130 includes the SOC chip, to implement the foregoing methods. The processing element 131 and the storage element 132 may be integrated into the chip, and the processing element 131 invokes the program stored in the storage element 132, to implement the foregoing methods or functions of the foregoing units. Alternatively, at least one integrated circuit may be integrated into the chip to implement the foregoing method or functions of the foregoing units. Alternatively, with reference to the foregoing implementations, functions of some of the units are implemented in a form of a program invoked by a processing element, and functions of some of the units are implemented in a form of an integrated circuit.

Regardless of a manner, the base station includes at least one processing element, a storage element, and a communications interface, and the at least one processing element is configured to perform the methods provided in the foregoing method embodiments. The processing element may perform some or all of the steps in the foregoing method embodiments in a first manner: executing the program stored in the storage element; or may perform some or all of the steps in the foregoing method embodiments in a second manner combining an integrated logic circuit of hardware in a processor element with an instruction. Certainly, the method provided in the foregoing method embodiments may alternatively be performed by combining the first manner and the second manner.

Similar to that in the foregoing descriptions, the processing element herein may be a general-purpose processor such as a CPU, or may be one or more integrated circuits configured to implement the foregoing methods, for example, one or more ASICs, one or more microprocessors or DSPs, or one or more FPGAs.

The storage element may be a memory, or may be a general term of a plurality of storage elements.

An embodiment further provides a storage medium, including a readable storage medium and a computer program, and the computer program is used to implement the data transmission method on a base station side provided in any one of the foregoing embodiments shown in FIG. 4 to FIG. 11.

An embodiment further provides a program product. The program product includes a computer program (namely, an executable instruction), and the computer program is stored in a readable storage medium. At least one processor of a base station may read the computer program from the readable storage medium, and the at least one processor executes the computer program, so that the base station implements the data transmission method on a base station side provided in any one of the foregoing embodiments shown in FIG. 4 to FIG. 11.

An embodiment further provides a data transmission apparatus, including at least one storage element and at least one processing element. The at least one storage element is configured to store a program, and when the program is executed, the data transmission apparatus performs an operation of a base station in any one of the foregoing method embodiments shown in FIG. 1 to FIG. 11. The apparatus may be a base station chip.

An embodiment further provides a storage medium, including a readable storage medium and a computer program, and the computer program is used to implement the data transmission method on a user equipment side provided in any one of the foregoing embodiments shown in FIG. 4 to FIG. 11.

An embodiment further provides a program product. The program product includes a computer program (namely, an executable instruction or instructions), and the computer program is stored in a readable storage medium. At least one processor of user equipment may read the computer program from the readable storage medium, and the at least one processor executes the computer program, so that a base station implements the data transmission method on a user equipment side provided in any one of the foregoing embodiments shown in FIG. 4 to FIG. 11.

An embodiment further provides a data transmission apparatus, including at least one storage element and at least one processing element. The at least one storage element is configured to store a program, and when the program is executed, the data transmission apparatus performs an operation of user equipment in any one of the foregoing method embodiments shown in FIG. 1 to FIG. 11. The apparatus may be a user equipment chip.

All or some steps of the foregoing method embodiments may be implemented by using hardware related to a program instruction. The foregoing program may be stored in a computer readable memory. When the program is executed, the steps in the foregoing method embodiments are performed. The memory (storage medium) includes a read-only memory (ROM), a random access memory (RAM), a flash memory, a hard disk, a solid state disk, a magnetic tape, a floppy disk, an optical disc, and any combination thereof.

What is claimed is:

1. A method, comprising:
    receiving a first random access request from a terminal device, wherein the first random access request is used to request first uplink scheduling information that indicates the terminal device uses a first transport block to transmit first user data in Msg 3, and the first transport block is used to transmit both signaling and user data;
    sending a first random access response to the terminal device in response to the first random access request, wherein the first random access response carries the first uplink scheduling information;
    receiving a first Msg 3 including both signaling and the first user data from the terminal device;
    sending the first user data to a mobility management entity;
    receiving a first end indication from the mobility management entity;
    receiving a second random access request from the terminal device, wherein the second random access request is used to request second uplink scheduling information that indicates the terminal device uses a second transport block to transmit second user data in Msg 3, and the second transport block is used to transmit both signaling and user data
    sending a second random access response to the terminal device in response to the second random access request, wherein the second random access response carries a third uplink scheduling information that indicates the terminal device uses a third transport block to transmit Msg 3, and the third transport block is used to transmit signaling, but is not used to transmit the second user data; and
    receiving a second Msg 3 including signaling from the terminal device,
    wherein the second Msg 3 includes a radio resource control (RRC) connection request signaling; and
    after receiving the second Msg 3, the method further comprises:

sending a Msg 4 carrying an RRC connection setup signaling to the terminal device;

sending a fourth uplink scheduling information to the terminal device, wherein the fourth uplink scheduling information is used for the terminal device to send the second user data; and receiving the second user data from the terminal device.

2. The method according to claim 1, wherein a size of the third transport block is 88 bits.

3. The method according to claim 1, wherein the second Msg 3 carries an identifier of the terminal device; and the Msg 4 carries the identifier of the terminal device.

4. The method according to claim 1, wherein the sending the fourth uplink scheduling information to the terminal device further comprises:

adding the fourth uplink scheduling information to a physical downlink control channel;

scrambling the physical downlink control channel by using a cell radio network temporary identifier (C-RNTI); and sending the scrambled physical downlink control channel to the terminal device.

5. The method according to claim 1, further comprising:
sending a Msg 4 including the end indication and/or third user data to the terminal device.

6. The method according to claim 1, further comprising:
sending the second user data to a mobility management entity; and receiving an end indication from the mobility management entity.

7. The method according to claim 6, further comprising:
sending the end indication to the terminal device.

8. The method according to claim 1, further comprising:
comparing a size of a currently idle uplink resource to a preset threshold;

selecting the first uplink scheduling information after the size of the currently idle uplink resource is greater than or equal to the preset threshold; and selecting the second uplink scheduling information after the size of the currently idle uplink resource is less than the preset threshold.

9. A method, comprising:

sending a first random access request to a base station, wherein the first random access request is used to request first uplink scheduling information that indicates a terminal device uses a first transport block to transmit first user data in Msg 3, and the first transport block is used to transmit both signaling and user data;

receiving, from the base station, a first random access response in response to the first random access request, wherein the first random access response carries the first uplink scheduling information;

sending a first Msg 3 including both signaling and the first user data;

sending a second random access request to the base station, wherein the second random access request is used to request second uplink scheduling information that indicates the terminal device uses a second transport block to transmit second user data in Msg 3, and the second transport block is used to transmit both signaling and user data;

receiving, from the base station, a second random access response in response to the second random access request, wherein the second random access response carries a third uplink scheduling information that indicates the terminal device uses a third transport block to transmit Msg 3, and the third transport block is used to transmit signaling, but is not used to transmit the second user data; and sending a second Msg 3 including signaling to the base station, wherein the second Msg 3 includes a radio resource control (RRC) connection request signaling; and after sending the second Msg 3 to the base station, the method further comprises:

receiving, from the base station, a Msg 4 carrying an RRC connection setup signaling;

receiving, from the base station, a fourth uplink scheduling information, wherein the fourth uplink scheduling information is used to send the second user data; and sending the second user data to the base station.

10. The method according to claim 9, wherein a size of the third transport block is 88 bits.

11. The method according to claim 9, wherein the second Msg 3 carries an identifier of the terminal device; and the Msg 4 carries the identifier of the terminal device.

12. The method according to claim 9, wherein the receiving, from the base station, the fourth uplink scheduling information to further comprises:

receiving, from the base station, a scrambled physical downlink control channel, which comprises the fourth uplink scheduling information added to a physical downlink control channel and scrambled by using a cell radio network temporary identifier (C-RNTI).

13. A data transmission apparatus, comprising:

at least one processor; and a memory storing computer-executable instructions, wherein the computer-executable instructions, when executed by the at least one processor, cause the data transmission apparatus to:

receive a first random access request from a terminal device, wherein the first random access request is used to request first uplink scheduling information that indicates the terminal device uses a first transport block to transmit first user data in Msg 3, and the first transport block is used to transmit both signaling and user data;

send a first random access response to the terminal device in response to the first random access request, wherein the first random access response carries the first uplink scheduling information;

receive a first Msg 3 including both signaling and the first user data from the terminal device;

send the first user data to a mobility management entity;

receive a first end indication from the mobility management entity;

receive a second random access request from the terminal device, wherein the second random access request is used to request second uplink scheduling information that indicates the terminal device uses a second transport block to transmit second user data in Msg 3, and the second transport block is used to transmit both signaling and user data send a second random access response to the terminal device in response to the second random access request, wherein the second random access response carries a third uplink scheduling information that indicates the terminal device uses a third transport block to transmit Msg 3, and the third transport block is used to transmit signaling, but is not used to transmit the second user data; and receive a second Msg 3 including signaling from the terminal device, wherein the second Msg 3 includes a radio resource control (RRC) connection request signaling; and after receiving the second Msg 3, the computer-executable instructions, when executed by the at least one processor, further cause the data transmission apparatus to:

send a Msg 4 carrying an RRC connection setup signaling to the terminal device;

send a fourth uplink scheduling information to the terminal device, wherein the fourth uplink scheduling information is used for the terminal device to send the second user data; and receive the second user data from the terminal device.

14. The data transmission apparatus according to claim 13, wherein the size of the third transport block is 88 bits.

15. A data transmission apparatus, comprising:

at least one processor; and a memory storing computer-executable instructions, wherein the computer-executable instructions, when executed by the at least one processor, cause the data transmission apparatus to:

send a first random access request to a base station, wherein the first random access request is used to request first uplink scheduling information that indicates a terminal device uses a first transport block to transmit first user data in Msg 3, and the first transport block is used to transmit both signaling and user data;

receive, from the base station, a first random access response in response to the first random access request, wherein the first random access response carries the first uplink scheduling information;

send a first Msg 3 including both signaling and the first user data;

send a second random access request to the base station, wherein the second random access request is used to request second uplink scheduling information that indicates the terminal device uses a second transport block to transmit second user data in Msg 3, and the second transport block is used to transmit both signaling and user data;

receive, from the base station, a second random access response in response to the second random access request, wherein the second random access response carries a third uplink scheduling information that indicates the terminal device uses a third transport block to transmit Msg 3, and the third transport block is used to transmit signaling, but is not used to transmit the second user data; and send a second Msg 3 including signaling to the base station, wherein the second Msg 3 includes a radio resource control (RRC) connection request signaling, wherein the computer-executable instructions, when executed by the at least one processor, further cause the data transmission apparatus to:

after sending the second Msg 3, receive a Msg 4 carrying an RRC connection setup signaling, receive a fourth uplink scheduling information, wherein the fourth uplink scheduling information is used by the terminal device to send the second user data, and send the second user data to the base station.

16. The system of claim 15, wherein a size of the third transport block is 88 bits.

* * * * *